United States Patent
Yoshida et al.

(10) Patent No.: US 10,410,072 B2
(45) Date of Patent: Sep. 10, 2019

(54) DRIVING SUPPORT APPARATUS, DRIVING SUPPORT SYSTEM, DRIVING SUPPORT METHOD, AND COMPUTER READABLE RECORDING MEDIUM

(71) Applicant: MITSUBISHI ELECTRIC CORPORATION, Tokyo (JP)

(72) Inventors: Michinori Yoshida, Tokyo (JP); Naoyuki Tsushima, Tokyo (JP); Takefumi Hasegawa, Tokyo (JP); Masahiro Abukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/772,475

(22) PCT Filed: Nov. 20, 2015

(86) PCT No.: PCT/JP2015/082658
§ 371 (c)(1),
(2) Date: Apr. 30, 2018

(87) PCT Pub. No.: WO2017/085857
PCT Pub. Date: May 26, 2017

(65) Prior Publication Data
US 2018/0315240 A1    Nov. 1, 2018

(51) Int. Cl.
*G06K 9/00* (2006.01)
*G06T 11/00* (2006.01)
(Continued)

(52) U.S. Cl.
CPC .......... *G06K 9/00805* (2013.01); *G06T 11/00* (2013.01); *G08G 1/09675* (2013.01);
(Continued)

(58) Field of Classification Search
CPC ......... G06K 9/00805; G08G 1/096791; G08G 1/096783
See application file for complete search history.

(56) References Cited

U.S. PATENT DOCUMENTS 5,369,590 A    11/1994   Karasudani
5,475,494 A    12/1995   Nishida et al.
(Continued)

FOREIGN PATENT DOCUMENTS

DE    4344485 A1    6/1994
JP    5-120385 A    5/1993
(Continued)

OTHER PUBLICATIONS

Final Office Action issued in related U.S. Appl. No. 15/035,023 dated Aug. 10, 2018.
(Continued)

*Primary Examiner* — Phi Hoang
(74) *Attorney, Agent, or Firm* — Birch, Stewart, Kolasch & Birch, LLP

(57) ABSTRACT

A driving support apparatus (10) converts at least one of a first map (43) and a second map (53) so that the first map (43) and the second map (53) become three-dimensional maps in a same coordinate system. The first map (43) is a three-dimensional map indicating three-dimensional positions of objects around a vehicle (100). The second map (53) is a three-dimensional map indicating three-dimensional positions of objects around an external apparatus (200) that is one of a roadside apparatus (201) and a different vehicle (202) from the vehicle (100). Then, the driving support apparatus (10) synthesizes the first map (43) and the second map (53) after the conversion, thereby generating a composite map (44).

11 Claims, 30 Drawing Sheets

(51) Int. Cl.
*H04N 7/18* (2006.01)
*G08G 1/0967* (2006.01)
*G01C 21/20* (2006.01)
*G05D 1/02* (2006.01)

(52) U.S. Cl.
CPC . *G08G 1/096716* (2013.01); *G08G 1/096741* (2013.01); *G08G 1/096783* (2013.01); *G08G 1/096791* (2013.01); *H04N 7/181* (2013.01); *G01C 21/20* (2013.01); *G05D 1/0212* (2013.01)

(56) References Cited

U.S. PATENT DOCUMENTS

| | | | |
|---|---|---|---|
| 5,523,765 A * | 6/1996 | Ichikawa | G01C 21/30 342/357.31 |
| 5,699,149 A | 12/1997 | Kuroda et al. | |
| 6,396,535 B1 | 5/2002 | Waters | |
| 6,658,136 B1 | 12/2003 | Brumitt | |
| 9,789,820 B2 | 10/2017 | Yamamoto | |
| 9,802,608 B2 | 10/2017 | Urano et al. | |
| 2002/0049534 A1 * | 4/2002 | Yuda | G01C 21/365 701/533 |
| 2004/0189512 A1 | 9/2004 | Takashima et al. | |
| 2005/0001715 A1 | 1/2005 | Itoh et al. | |
| 2005/0100192 A1 | 5/2005 | Fujimura et al. | |
| 2005/0171654 A1 * | 8/2005 | Nichols | G08G 5/0078 701/15 |
| 2007/0003162 A1 | 1/2007 | Miyoshi et al. | |
| 2007/0046449 A1 | 3/2007 | Koike et al. | |
| 2007/0078601 A1 | 4/2007 | Nakano et al. | |
| 2007/0154068 A1 | 7/2007 | Stein et al. | |
| 2007/0182528 A1 * | 8/2007 | Breed | B60Q 9/008 340/435 |
| 2007/0229310 A1 | 10/2007 | Sato | |
| 2008/0088707 A1 | 4/2008 | Iwaki et al. | |
| 2008/0186382 A1 | 8/2008 | Tauchi et al. | |
| 2008/0243390 A1 | 10/2008 | Nakamori | |
| 2009/0073258 A1 | 3/2009 | Robert et al. | |
| 2009/0237644 A1 | 9/2009 | Uechi | |
| 2010/0054580 A1 | 3/2010 | Miyoshi et al. | |
| 2010/0169013 A1 * | 7/2010 | Nakamura | G01C 21/30 701/469 |
| 2011/0216946 A1 | 9/2011 | Kawaguchi | |
| 2011/0267499 A1 | 11/2011 | Wan et al. | |
| 2012/0092499 A1 | 4/2012 | Klar | |
| 2012/0140984 A1 | 6/2012 | Miyajima | |
| 2013/0322692 A1 | 12/2013 | Guan | |
| 2013/0332112 A1 | 12/2013 | Nakamura | |
| 2014/0132707 A1 | 5/2014 | Hashimoto | |
| 2014/0294287 A1 | 10/2014 | Guo et al. | |
| 2015/0073705 A1 | 3/2015 | Hiwatashi | |
| 2015/0109118 A1 | 4/2015 | Urano et al. | |
| 2015/0243017 A1 | 8/2015 | Fujimoto et al. | |
| 2015/0285648 A1 * | 10/2015 | Masuda | G01C 21/3423 701/533 |
| 2015/0329049 A1 | 11/2015 | Kanou et al. | |
| 2016/0003936 A1 | 1/2016 | Hibino | |
| 2016/0091328 A1 * | 3/2016 | Ould-Ahmen-Vall | G01C 21/3415 701/117 |
| 2016/0275359 A1 | 9/2016 | Yoshida et al. | |
| 2017/0061219 A1 | 3/2017 | Shin et al. | |
| 2017/0098132 A1 | 4/2017 | Yokota et al. | |
| 2017/0140230 A1 | 5/2017 | Yoshida et al. | |
| 2017/0144585 A1 | 5/2017 | Ogawa | |
| 2017/0177955 A1 | 6/2017 | Yokota et al. | |
| 2017/0213094 A1 | 7/2017 | Kamiya | |
| 2017/0240170 A1 | 8/2017 | Tani | |
| 2017/0259814 A1 | 9/2017 | Fujimura et al. | |
| 2017/0262715 A1 | 9/2017 | Kozuka et al. | |
| 2017/0262716 A1 | 9/2017 | Matsumoto | |

FOREIGN PATENT DOCUMENTS

| | | |
|---|---|---|
| JP | 6-88706 A | 3/1994 |
| JP | 6-293236 A | 10/1994 |
| JP | 7-182484 A | 7/1995 |
| JP | 7-332966 A | 12/1995 |
| JP | 10-129375 A | 5/1998 |
| JP | 2000-121300 A | 4/2000 |
| JP | 2000-244897 A | 9/2000 |
| JP | 2001-134782 A | 5/2001 |
| JP | 2001-195692 A | 7/2001 |
| JP | 2001-195700 A | 7/2001 |
| JP | 2002-32742 A | 1/2002 |
| JP | 2002-362302 A | 12/2002 |
| JP | 2003-44996 A | 2/2003 |
| JP | 2003-308599 A | 10/2003 |
| JP | 2004-125479 A | 4/2004 |
| JP | 2005-62924 A | 3/2005 |
| JP | 2005-90974 A | 4/2005 |
| JP | 2005-127781 A | 5/2005 |
| JP | 2005-175603 A | 6/2005 |
| JP | 2006-12178 A | 1/2006 |
| JP | 2006-48435 A | 2/2006 |
| JP | 2006-127358 A | 5/2006 |
| JP | 2006-190198 A | 7/2006 |
| JP | 2006-322797 A | 11/2006 |
| JP | 2006-339960 A | 12/2006 |
| JP | 2007-49219 A | 2/2007 |
| JP | 2007-102492 A | 4/2007 |
| JP | 2007-102577 A | 4/2007 |
| JP | 2007-172541 A | 7/2007 |
| JP | 2007-249811 A | 9/2007 |
| JP | 2008-70955 A | 3/2008 |
| JP | 2008-191988 A | 8/2008 |
| JP | 2008-276689 A | 11/2008 |
| JP | 2009-180662 A | 8/2009 |
| JP | 2009-199532 A | 9/2009 |
| JP | 2010-85322 A | 4/2010 |
| JP | 2010-250452 A | 11/2010 |
| JP | 2011-60179 A | 3/2011 |
| JP | 2011-95929 A | 5/2011 |
| JP | 2011-196942 A | 10/2011 |
| JP | 2011-215474 A | 10/2011 |
| JP | 2012-180055 A | 9/2012 |
| JP | 2013-19684 A | 1/2013 |
| JP | 2014-106200 A | 6/2014 |
| WO | WO 2005/088970 A1 | 9/2005 |
| WO | WO 2012/117528 A1 | 9/2012 |
| WO | WO 2013/171784 A1 | 11/2013 |

OTHER PUBLICATIONS

Advisory Action issued in related U.S. Appl. No. 15/035,023 dated Nov. 16, 2018.

Chinese Office Action issued in corresponding Chinese Application No. 201480081340.2 dated May 30, 2018.

International Search Report issued in PCT/JP2015/082658 dated Feb. 16, 2016.

Japanese Office Action issued for JP 2016-546854 dated Nov. 29, 2016.

Notice of Allowance issued in copending U.S. Appl. No. 15/323,922 dated Sep. 27, 2018.

* cited by examiner

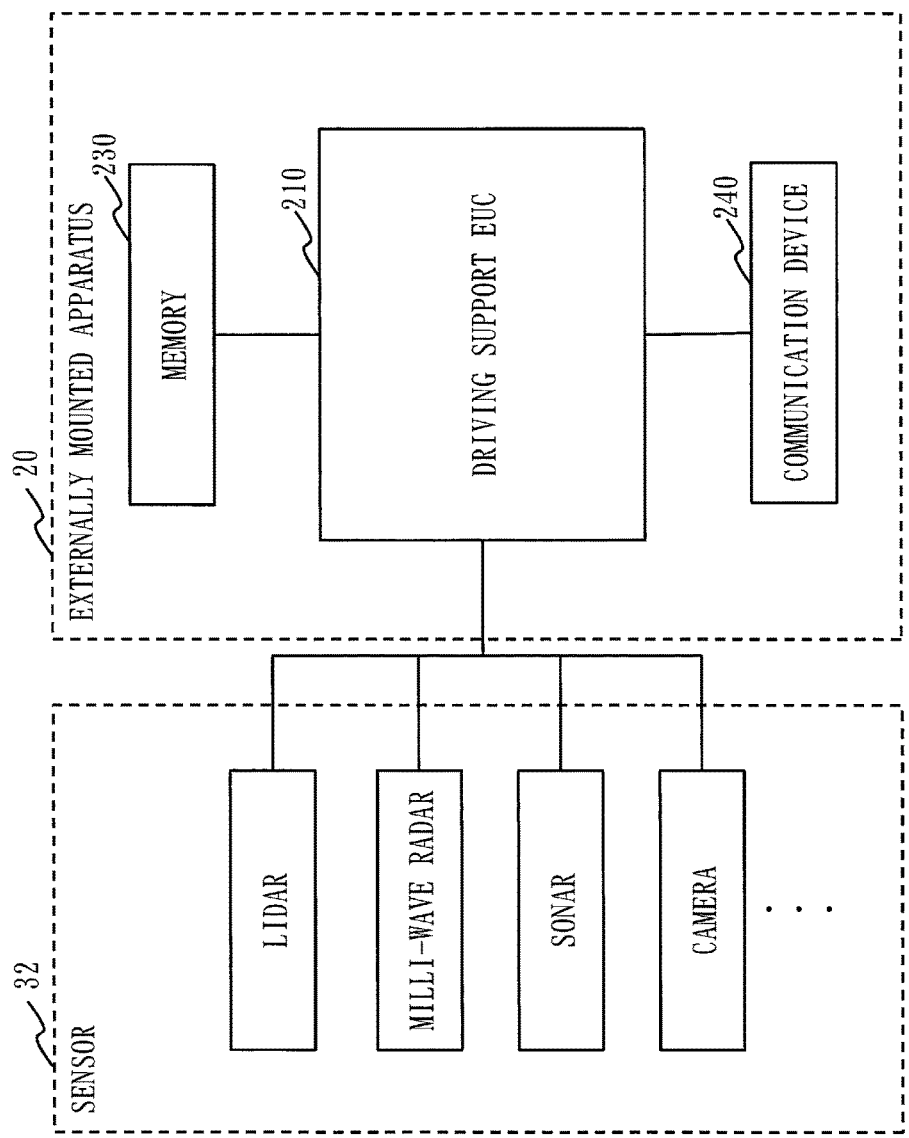

DRIVING SUPPORT APPARATUS, DRIVING SUPPORT SYSTEM, DRIVING SUPPORT METHOD, AND COMPUTER READABLE RECORDING MEDIUM

TECHNICAL FIELD

The present invention relates to a technology for acquiring three-dimensional position information of an object that is present around a vehicle.

BACKGROUND ART

There is known an automatic steering technology for sensing an obstacle around a vehicle using a sensor such as a laser radar or a milli-wave radar and performing control of the vehicle based on a result of the sensing.

Patent Literature 1 describes synthesis of an image taken by a roadside camera installed on a road into an image taken by an on-vehicle camera. This makes it easy for a driver of the vehicle to intuitively grasp a different vehicle that is present far away.

CITATION LIST

Patent Literature

Patent Literature 1: JP 2008-191988 A

SUMMARY OF INVENTION

Technical Problem

In Patent Literature 1, the distance from the vehicle to the different vehicle and the direction of the different vehicle with respect to the vehicle are identified, based on detection information of a radar mounted on the vehicle. Then, in Patent Literature 1, the different vehicle included in the image taken by the roadside camera is synthesized into the image taken by the on-vehicle camera, based on the distance and the direction that have been identified. Therefore, in Patent Literature 1, a synthetic image, in which a different vehicle that cannot be detected by the radar mounted on the vehicle is displayed in a correct position, cannot be generated.

An object of the present invention is to enable generation of a three-dimensional map whose range is expanded and on which the position of an object around a vehicle that cannot be detected from the vehicle is also correctly displayed.

Solution to Problem

A driving support apparatus according to the present invention may include:

a map generation unit to generate a first map being a three-dimensional map indicating three-dimensional positions of objects around a vehicle;

a coordinate synchronization unit to convert at least one of the first map generated by the map generation unit and a second map so that the first map and the second map become three-dimensional maps in a same coordinate system, the second map being a three-dimensional map indicating three-dimensional positions of objects around an external apparatus, the external apparatus being one of a roadside apparatus and a different vehicle from the vehicle; and a synthesizing unit to generate a composite map by synthesizing the first map and the second map after the conversion by the coordinate synchronization unit.

Advantageous Effects of Invention

In the present invention, after at least one of the first map and the second map has been converted so that the first map and the second map become the three-dimensional maps of the same coordinate system, the first map and the second map are synthesized. This can generate a three-dimensional map whose range is expanded and on which the position of an object around a vehicle that cannot be detected from the vehicle is correctly displayed.

BRIEF DESCRIPTION OF DRAWINGS

FIG. 30 is a hardware configuration diagram of an externally mounted apparatus 20 according to the first to fourth embodiments.

DESCRIPTION OF EMBODIMENTS

First Embodiment

\*\*\*Configuration of Driving Support System 1\*\*\*

Figure 1:
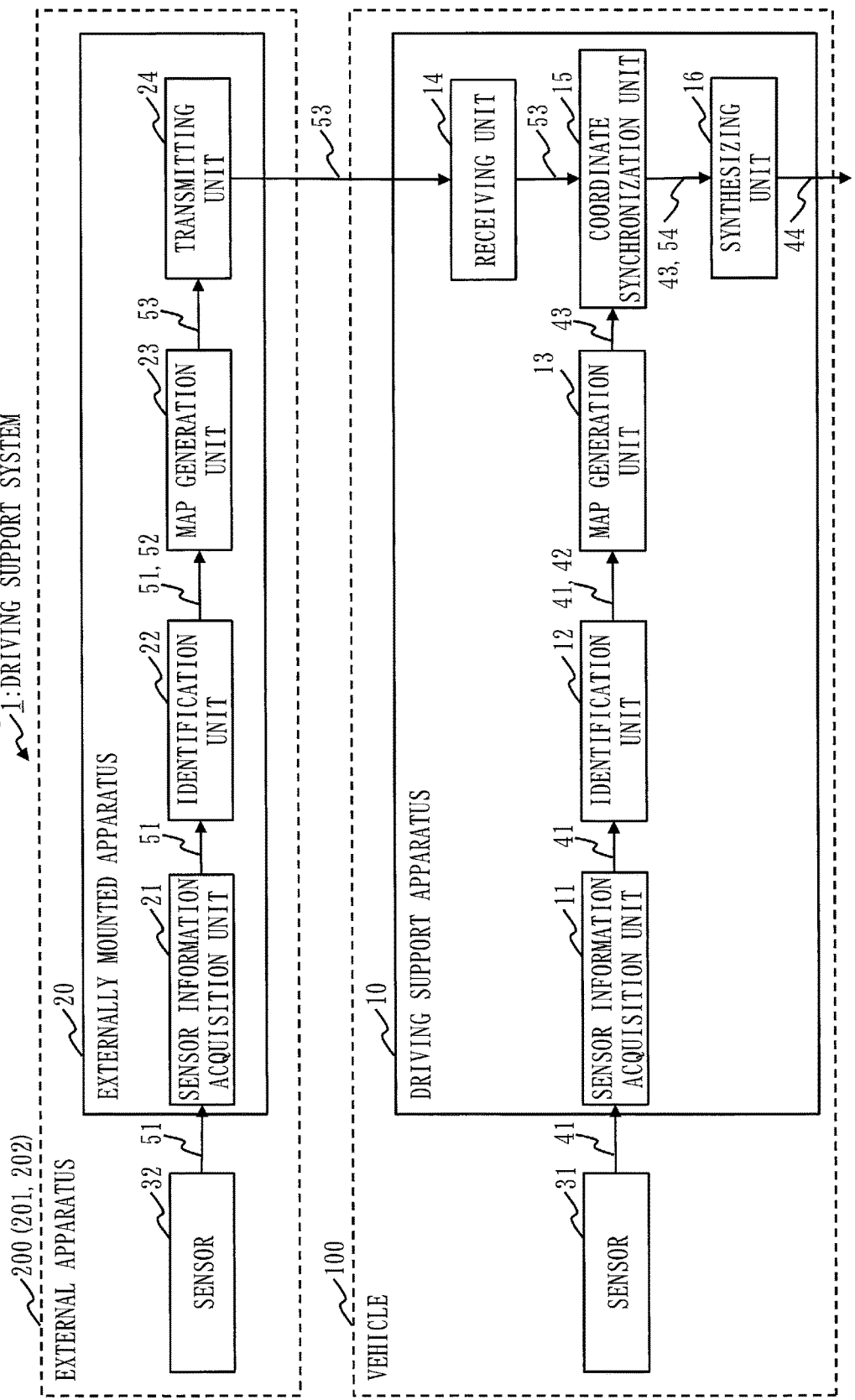
FIG. 1 is a configuration diagram of a driving support system 1 according to a first embodiment.

FIG. 1 is a configuration diagram of a driving support system 1 according to a first embodiment.

The driving support system 1 includes a driving support apparatus 10, an externally mounted apparatus 20, a sensor 31, and a sensor 32.

The driving support apparatus 10 is mounted on a vehicle 100 and supports driving of the vehicle 100. The externally mounted apparatus 20 is mounted on an external apparatus 200 that is one of a roadside apparatus 201 installed on a road and a vehicle 202 different from the vehicle 100. The driving support apparatus 10 and the externally mounted apparatus 20 are communicatable.

The sensor 31 is mounted on the vehicle 100, and the sensor 32 is mounted on the external apparatus 200.

Each of the sensor 31 and the sensor 32 is a LIDAR (Light Detection and Ranging), a milli-wave radar, a sonar, a camera, or the like. Each of the sensor 31 and the sensor 32 irradiates a laser light, a radio wave, or a sound wave and detects reflection of the laser light, the radio wave, or the sound wave, thereby detecting sensor information 41 or 51 indicating the distance and the angle from the vehicle 100 or the external apparatus 200 to an object that is present around the vehicle 100 or the external apparatus 200 and may become an obstacle, and the shape of the object.

The driving support apparatus 10 includes a sensor information acquisition unit 11, an identification unit 12, a map generation unit 13, a receiving unit 14, a coordinate synchronization unit 15, and a synthesizing unit 16.

The sensor information acquisition unit 11 acquires the sensor information 41 detected by the sensor 31 on the object which is present around the vehicle 100.

The identification unit 12 identifies an attribute 42 of the object around the vehicle 100, based on the sensor information 41 acquired by the sensor information acquisition unit 11. The attribute 42 of each object is the type of the object, and is pedestrian, two-wheeled vehicle, or four-wheeled vehicle, as a specific example. The identification unit 12 may identify the attribute 42 of each object according to the shape of the object.

The map generation unit 13 generates a first map 43 being a three-dimensional map indicating the three-dimensional position and the attribute 42 of each object around the vehicle 100 at a certain time, based on the sensor information 41 acquired by the sensor information acquisition unit 11 and the attribute 42 of each object identified by the identification unit 12.

The receiving unit 14 receives, from the externally mounted apparatus 20, a second map 53 being a three-dimensional map including the three-dimensional position and the attribute of each object around the external apparatus 200.

The coordinate synchronization unit 15 converts at least one of the first map 43 and the second map 53 so that the first map 43 generated by the map generation unit 13 and the second map 53 received by the receiving unit 14 are three-dimensional maps of a same coordinate system.

Herein, the coordinate synchronization unit 15 converts the second map 53 so that a second coordinate system being the coordinate system of the second map 53 matches a first coordinate system being the coordinate system of the first map 43, thereby generating a converted map 54.

The synthesizing unit 16 synthesizes the first map 43 and the second map 53 converted by the coordinate synchronization unit 15, thereby generating a composite map 44.

Herein, the synthesizing unit 16 synthesizes the first map 43 generated by the map generation unit 13 and the converted map 54 generated by the coordinate synchronization unit 15.

The externally mounted apparatus 20 includes a sensor information acquisition unit 21, an identification unit 22, a map generation unit 23, and a transmitting unit 24.

The sensor information acquisition unit 21 acquires the sensor information 51 detected by the sensor 32 on the object that is present around the external apparatus 200.

The identification unit 22 identifies an attribute 52 of the object around the external apparatus 200, based on the sensor information 51 acquired by the sensor information acquisition unit 21. The attribute 52 of each object has the same meaning as the attribute 42 of each object. Similarly to the identification unit 12, the identification unit 22 may identify the attribute 52 of each object according to the shape of the object.

The map generation unit 23 generates the second map 53 being the three-dimensional map indicating the three-dimensional position and the attribute 52 of each object around the external apparatus 200 at the certain time, based on the sensor information 51 acquired by the sensor information acquisition unit 21 and the attribute 52 of each object identified by the identification unit 22.

The transmitting unit 24 transmits, to the driving support apparatus 10, the second map 53 generated by the map generation unit 23.

\*\*\*Operations of Driving Support System 1\*\*\*

Figure 2:
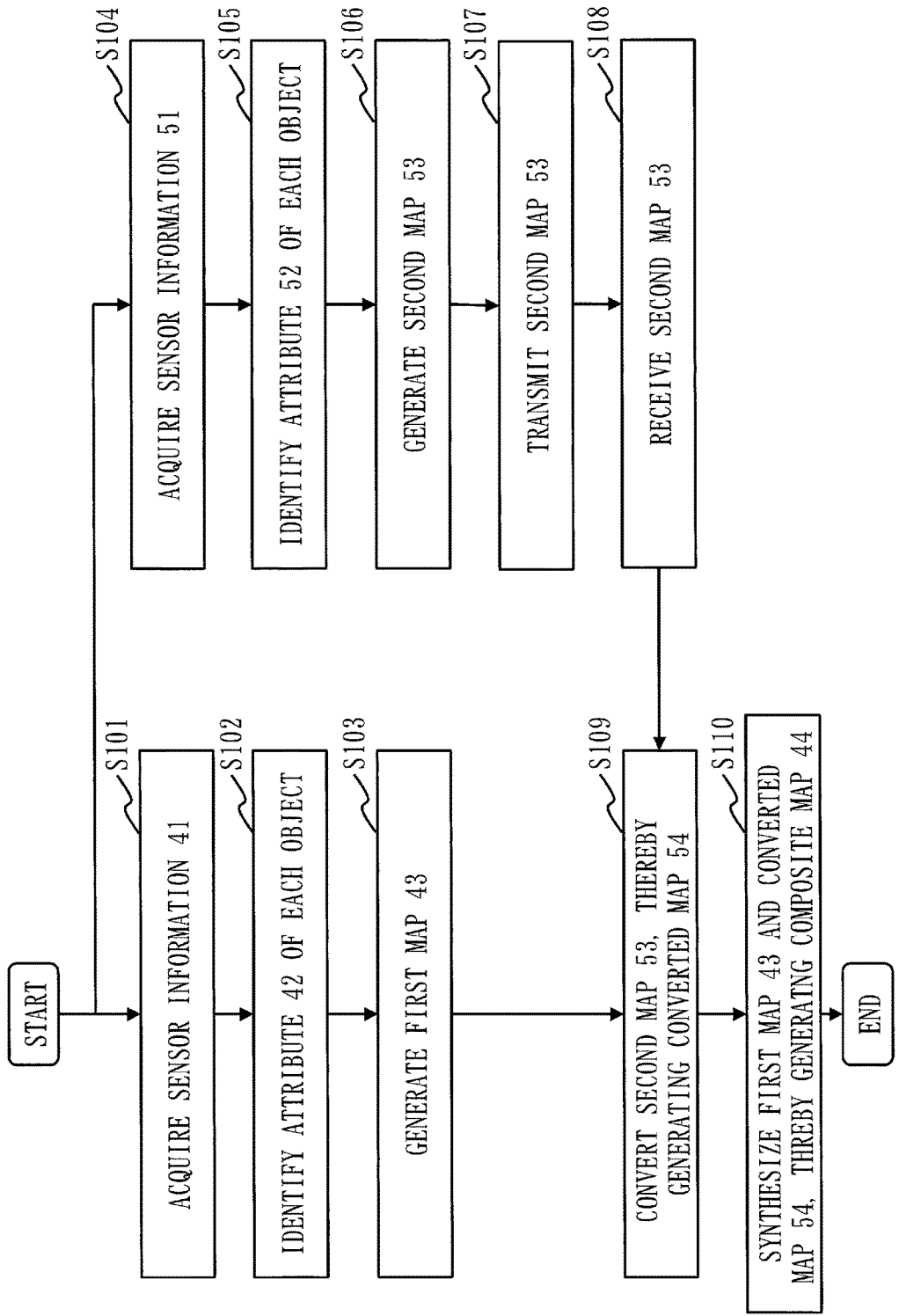
FIG. 2 is a flowchart illustrating operations of the driving support system 1 according to the first embodiment.

FIG. 2 is a flowchart illustrating operations of the driving support system 1 according to the first embodiment.

The operations of the driving support system 1 according to the first embodiment correspond to a driving support method according to the first embodiment. The operations of the driving support system 1 according to the first embodiment correspond to driving support program processes according to the first embodiment.

In a vehicle sensor information acquisition process in S101, the sensor information acquisition unit 11 acquires sensor information 41.

In a vehicle identification process in S102, the identification unit 12 identifies the attribute 42 of each object around the vehicle 100, based on the sensor information 41 acquired in S101.

In a vehicle map generation process in S103, the map generation unit 13 generates a first map 43 at a time when the sensor information 41 has been acquired in S101, based on the sensor information 41 acquired in S101 and the attribute 42 of each object identified in S102.

Figure 3:
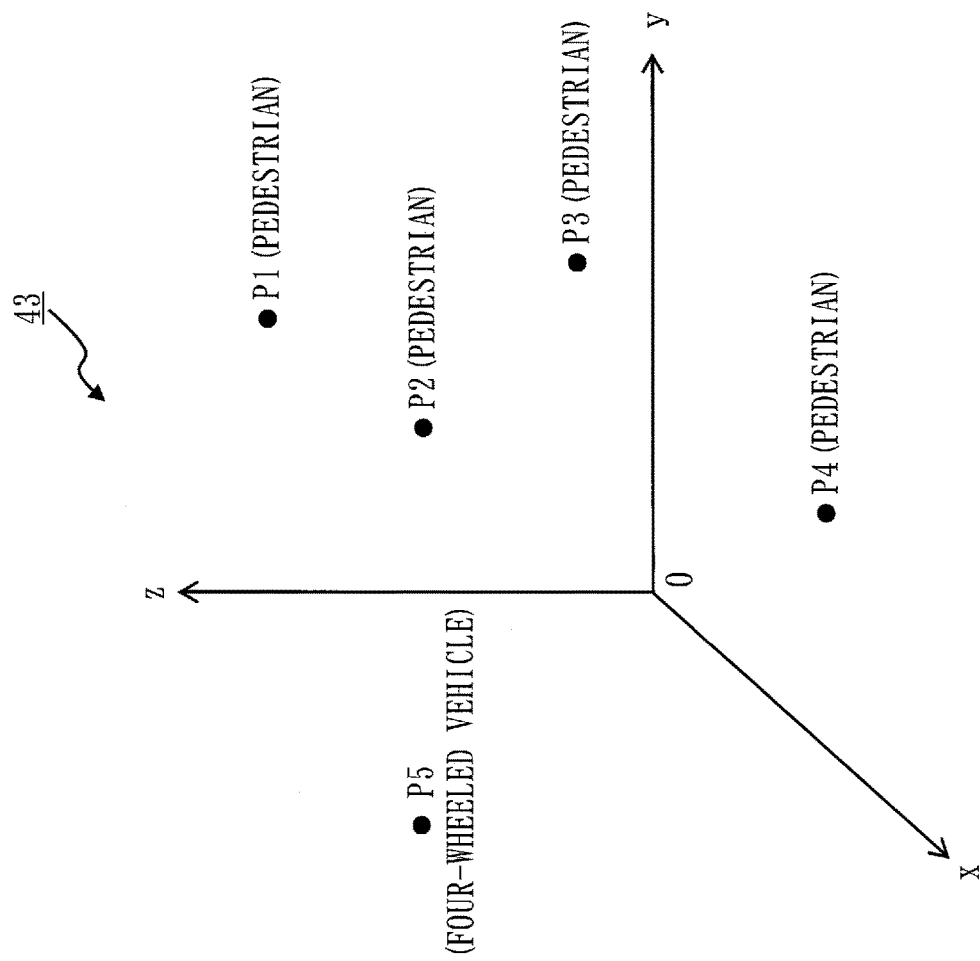
FIG. 3 is an explanatory diagram of a first map 43 according to the first embodiment.

FIG. 3 is an explanatory diagram of the first map 43 according to the first embodiment.

The first map 43 indicates the three-dimensional position of each object around the vehicle 100, using coordinates in an xyz orthogonal coordinate system using the position of the vehicle 100 as a center O. The xyz orthogonal coordinate system using the position of the vehicle 100 as the center O is the first coordinate system.

FIG. 3 illustrates points P1 to P5 indicating the three-dimensional positions of five objects and the attributes 42 of the five objects.

In an external sensor information acquisition process in S104, the sensor information acquisition unit 21 acquires sensor information 51.

In an external identification process in S105, the identification unit 22 identifies the attribute 52 of each object around the external apparatus 200, based on the sensor information 51 acquired in S104.

In an external map generation process in S106, the map generation unit 23 generates a second map 53 at a time when the sensor information 51 has been acquired in S104, based on the sensor information 51 acquired in S104 and the attribute 52 of each object identified in S105.

Figure 4:
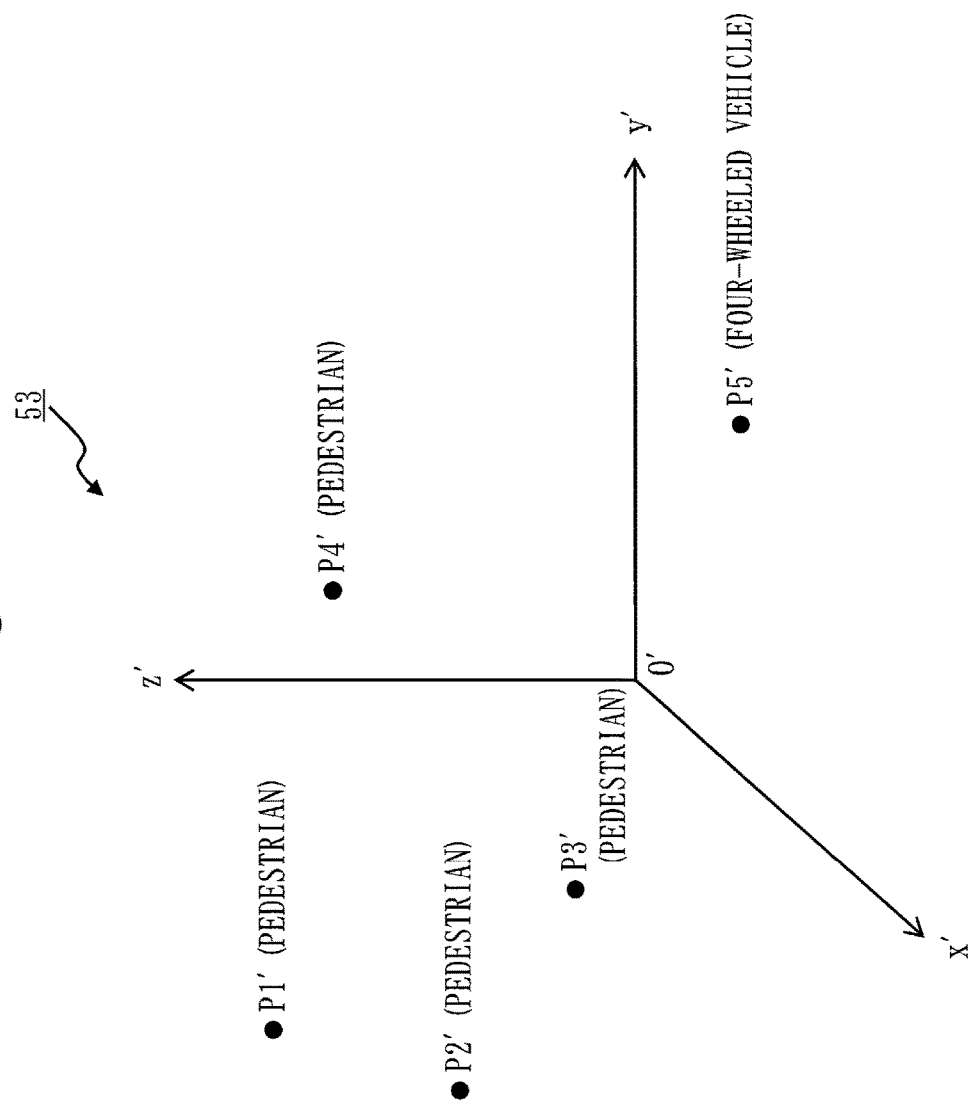
FIG. 4 is an explanatory diagram of a second map 53 according to the first embodiment.

FIG. 4 is an explanatory diagram of the second map 53 according to the first embodiment.

The second map 53 indicates the three-dimensional position of each object around the external apparatus 200, using coordinates in an x'y'z' orthogonal coordinate system using the position of the external apparatus 200 as a center O'. The x'y'z' orthogonal coordinate system using the position of the external apparatus 200 as the center O' is the second coordinate system.

FIG. 4 illustrates points P1' to P5' indicating the three-dimensional positions of five objects and the attributes 52 of the five objects.

It is assumed herein that the objects represented by the points P1' to P3' illustrated in FIG. 4 respectively correspond to the objects represented by the points P1 to P3 illustrated in FIG. 3. It is also assumed that there are no objects in FIG. 4 corresponding to the objects represented by the points P4 and P5 illustrated in FIG. 3 and that there are no objects in FIG. 3 corresponding to the objects represented by the points P4' and P5' illustrated in FIG. 4. That is, it is assumed that the objects represented by the points P4 and P5 are outside the sensing range of the sensor 32 and the externally mounted apparatus 20 cannot detect the objects represented by the points P4 and P5 and that the objects represented by the points P4' and P5' are outside the sensing range of the sensor 31 and the driving support apparatus 10 cannot detect the objects represented by the points P4' and P5'.

In a map transmitting process in S107, the transmitting unit 24 transmits, to the driving support apparatus 10, the second map 53 generated in S106.

In a map receiving process in S108, the receiving unit 14 receives the second map 53 transmitted in S107.

In a coordinate synchronization process in S109, the coordinate synchronization unit 15 converts the second map 53 so that the second coordinate system being the coordinate system of the second map 53 received in S108 matches the first coordinate system being the coordinate system of the first map 43 generated in S103, thereby generating a converted map 54.

Details of the coordinate synchronization process will be described later.

Figure 5:
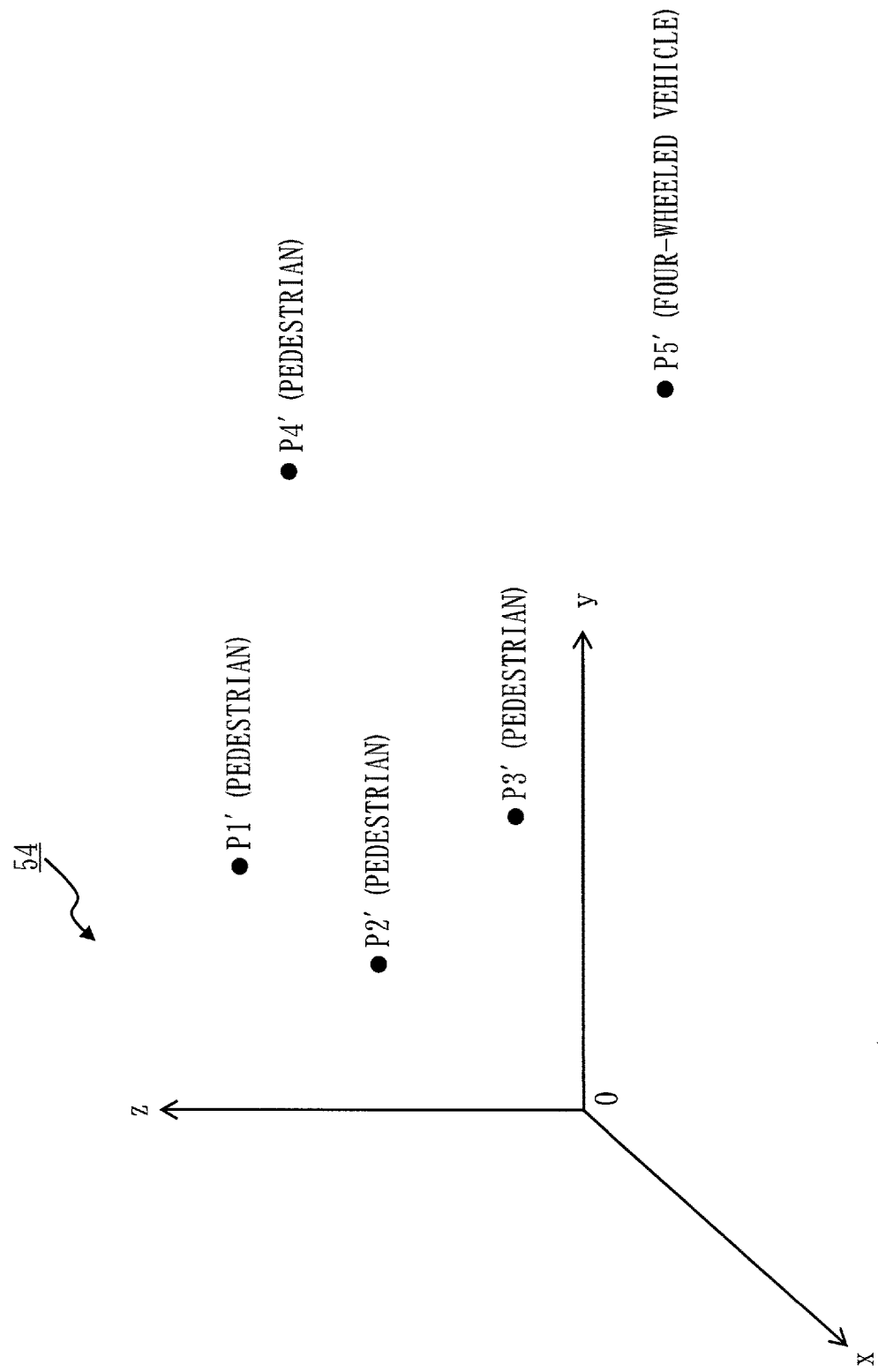
FIG. 5 is an explanatory diagram of a converted map 54 according to the first embodiment.

FIG. 5 is an explanatory diagram of the converted map 54 according to the first embodiment.

The converted map 54 indicates the three-dimensional position of each object around the external apparatus 200 using coordinates in the first coordinate system.

FIG. 5 illustrates the converted map 54 that has been generated by converting the second map 53 illustrated in FIG. 4. Therefore, in FIG. 5, the three-dimensional positions of the points P1' to P5' illustrated in FIG. 4 are indicated, using the coordinates in the first coordinate system. As mentioned above, the objects represented by the points P1' to P3' illustrated in FIG. 4 respectively correspond to the objects represented by the P1 to P3 illustrated in FIG. 3. Therefore, coordinate values of the points P1' to P3' are respectively converted to coordinate values of the points P1 to P3.

In a synthesis process in S110, the synthesizing unit 16 synthesizes the first map 43 generated in S103 and the converted map 54 generated in S109, thereby generating a composite map 44.

Figure 6:
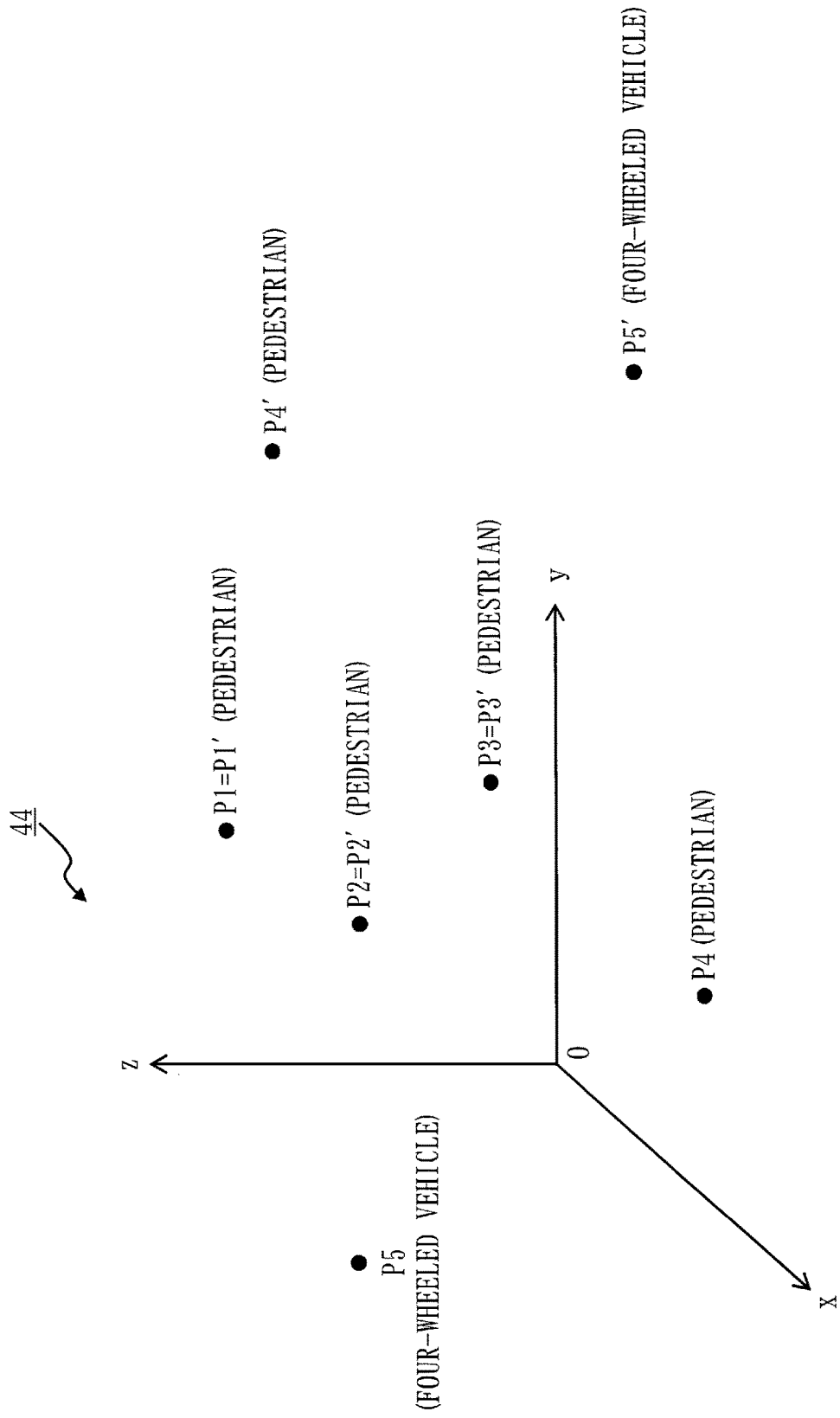
FIG. 6 is an explanatory diagram of a composite map 44 according to the first embodiment.

FIG. 6 is an explanatory diagram of the composite map 44 according to the first embodiment.

The composite map 44 indicates the three-dimensional positions of the objects around the vehicle 100 and the external apparatus 200 using the coordinates in the first coordinate system.

FIG. 6 illustrates the composite map 44 obtained by synthesizing the first map 43 illustrated in FIG. 3 and the converted map 54 illustrated in FIG. 5. Therefore, FIG. 6 illustrates the points P1 to P5 and the points P1' to P5'. The points P1 to P3 are respectively illustrated at the same positions as the points P1' to P3'.

The coordinate synchronization process in S109 will be described in detail.

\*\*\*Configuration of Coordinate Synchronization Unit 15\*\*\*

Figure 7:
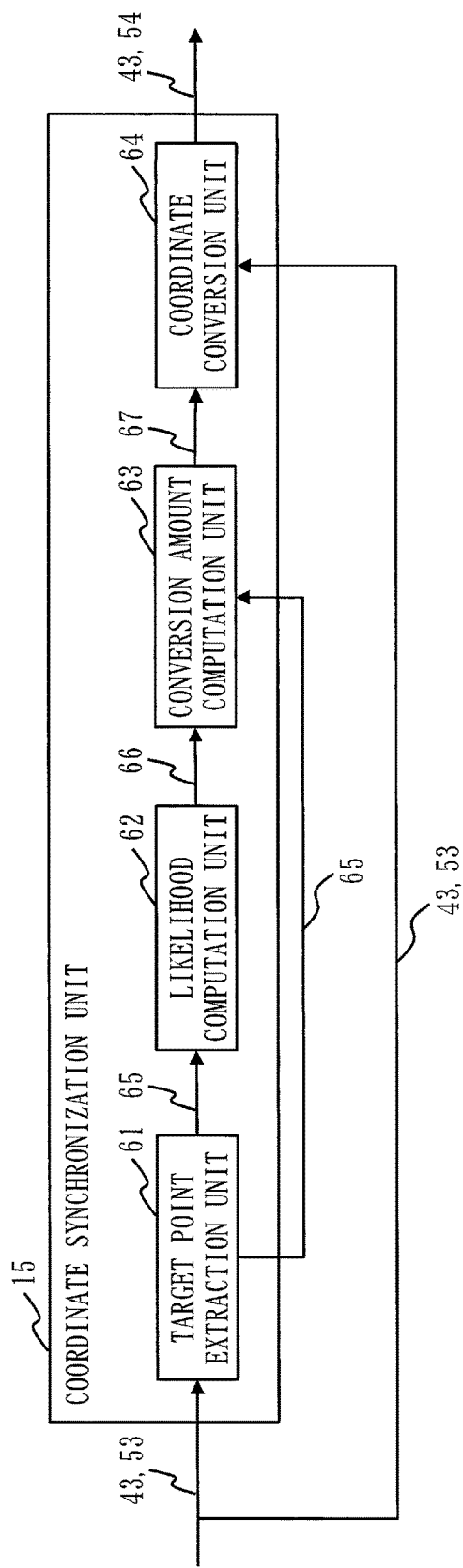
FIG. 7 is a configuration diagram of a coordinate synchronization unit 15 according to the first embodiment.

FIG. 7 is a configuration diagram of the coordinate synchronization unit 15 according to the first embodiment.

The coordinate synchronization unit 15 includes a target point extraction unit 61, a likelihood computation unit 62, a conversion amount computation unit 63, and a coordinate conversion unit 64.

The target point extraction unit 61 repeatedly extracts, from a plurality of points indicating the three-dimensional positions of the objects in the first map 43, three target points 65 as a point a1, a point a2, and a point a3. The target point extraction unit 61 repeatedly extracts, from a plurality of points indicating the three-dimensional positions of the objects in the second map 53, three target points 65 respectively made to correspond to the point a1, the point a2, and the point a3, as a point b1, a point b2, and a point b3.

The target point extraction unit 61 sets, as the target points 65, the points which are different so that each time the target point extraction unit 61 performs the repetitive extractions, one or more of the point a1 and the point b1, the point a2 and the point b2, and the point a3 and the point b3 become different combinations. Alternatively, the target point extraction unit 61 extracts the target points 65 by changing the order of the extractions.

The likelihood computation unit 62 computes a likelihood 66 when the point a1 and the point b1 indicate a same position, the point a2 and the point b2 indicate a same position, and the point a3 and the point b3 indicate a same position.

The conversion amount computation unit 63 selects, among the target points 65 repeatedly extracted by the target point extraction unit 61, the target points 65 having a high likelihood 66 computed by the likelihood computation unit 62. The conversion amount computation unit 63 computes a conversion amount 67 for matching the second coordinate system to the first coordinate system, assuming that, with respect to the selected target points 65, the point a1 and the point b1 indicate the same position, the point a2 and the point b2 indicate the same position, and the point a3 and the point b3 indicate the same position.

The conversion amount 67 is constituted from a rotation amount R and a translation amount T, and is indicated, as in Expression 1. Herein, the rotation amount R is represented as a matrix with three rows and three columns, and the translation amount T is represented as a matrix with three rows and one column because the first coordinate system and the second coordinate system are three-dimensional. That is, components of $R_{11}$ to $R_{33}$ in Expression 1 indicate the rotation amount R, and components of $T_1$ to $T_3$ indicate the translation amount T.

$$\begin{pmatrix} x' \\ y' \\ z' \\ 1 \end{pmatrix} = \begin{pmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{pmatrix} \begin{pmatrix} x'' \\ y'' \\ z'' \\ 1 \end{pmatrix} \quad \text{[Expression 1]}$$

Using the conversion amount 67 computed by the conversion amount computation unit 63, the coordinate conversion unit 64 converts the second map 53, thereby generating the converted map 54. That is, the coordinate conversion unit 64 rotates the second map 53 just by the rotation amount R constituting the conversion amount 67 and translates the second map 53 just by the translation amount T constituting the conversion amount 67, thereby generating the converted map 54.

*Operations of Coordinate Synchronization Unit 15*

Figure 8:
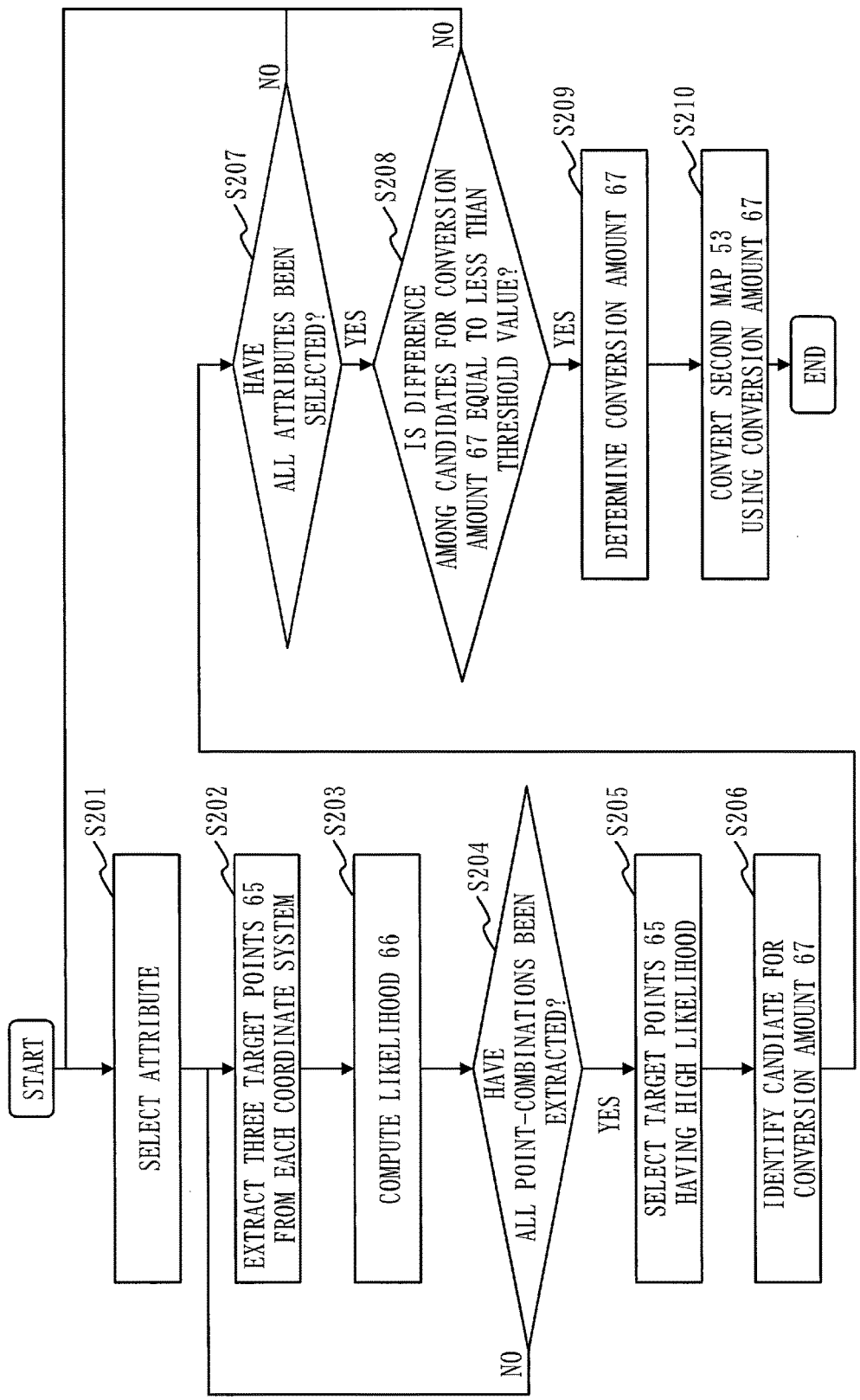
FIG. 8 is a flowchart illustrating operations of the coordinate synchronization unit 15 according to the first embodiment.

FIG. 8 is a flowchart illustrating operations of the coordinate synchronization unit 15 according to the first embodiment.

In an attribute selection process in S201, the target point extraction unit 61 selects, from the attributes of the objects, one attribute. Then, the target point extraction unit 61 specifies, among the plurality of points indicating the three-dimensional positions of the objects in the first map 43, the points whose attributes 42 identified in S102 are the selected attribute, as first specific points. Further, the target point extraction unit 61 specifies, among the plurality of points indicating the three-dimensional positions of the objects in the second map 53, the points whose attributes 52 identified in S105 are the selected attribute, as second specific points.

It is assumed herein that the target point extraction unit 61 has selected pedestrian, as the attribute. Therefore, the points P1 to P4 whose attributes 42 are the pedestrian in the first map 43 illustrated in FIG. 3 are specified as the first specific points. Further, the points P1' to P4' whose attributes 52 are the pedestrian in the second map 53 illustrated in FIG. 4 are specified as the second specific points.

The target point extraction unit 61 targets only the attribute included in a reference number or more of the points in each of the first map 43 and the second map 53. This is because, when the number of the points is small, the number of the points corresponding to each other between the first map 43 and the second map 53 may not be less than three.

In a target point extraction process in S202, the target point extraction unit 61 extracts, from the first specific points specified in S201, three target points 65 as the point a1, the point a2, and the point a3. Further, the target point extraction unit 61 extracts, from the specified second specific points, three target points 65 respectively made to correspond to the point a1, the point a2, and the point a3, as the point b1, the point b2, and the point b3.

Herein, three points among the points P1 to P4 illustrated in FIG. 3 are extracted as the target points 65. Further, three points among the points P1' to P4' illustrated in FIG. 4 are extracted as the target points 65.

In a likelihood computation process in S203, the likelihood computation unit 62 computes, with respect to the target points 65 extracted in S202, the likelihood 66 when the point a1 and the point b1 indicate the same position, the point a2 and the point b2 indicate the same position, and the point a3 and the point b3 indicate the same position.

Details of the likelihood computation process will be described later.

In a target determination process in S204, the target point extraction unit 61 determines whether or not all point-combinations of the first specific points and the second specific points specified in S201 have been extracted as the point a1, the point a2, the point a3, the point b1, the point b2, and the point b3.

It is determined herein whether the all point-combinations, such as (1) the combination of the point P1 as the point a1, the point P2 as the point a2, the point P3 as the point a3, the point P1' as the point b1, the point P2' as the point b2, and the point P3' as the point b3; (2) the combination of the point P1 as the point a1, the point P2 as the point a2, the point P3 as the point a3, the point P1' as the point b1, the point P2' as the point b2, and the point P4' as the pint b3, (3) the combination of the point P1 as the point a1, the point P2 as the point a2, the point P3 as the point a3, the point P1' as the point b1, the point P4' as the point b2, and the point P3' as the point b3, . . . have been extracted.

If all combinations of the points have been extracted (YES in S204), the procedure is caused to proceed to S205. On the other hand, if there is any combination that has not been extracted (NO in S204), the procedure is returned to S202, and the combination that has not been extracted is extracted.

In a target point selection process in S205, the conversion amount computation unit 63 selects the point a1, the point a2, the point a3, the point b1, the point b2, and the point b3 that are the target points 65 having a highest likelihood 66 computed in S203.

In a conversion amount candidate computation process in S206, the conversion amount computation unit 63 assumes that, with respect to the selected target points 65, the point a1 and the point b1 indicate the same position, the point a2 and the point b2 indicate the same position, and the point a3 and the point b3 indicate the same position. Then, the conversion amount computation unit 63 computes the rotation amount R and the translation amount T that are the conversion amount 67 for matching the second coordinate system to the first coordinate system under this assumption. The conversion amount computation unit 63 sets the computed conversion amount 67 to a candidate for the conversion amount 67 with respect to the attribute selected in S201.

When three sets of corresponding points are known between the first coordinate system and the second coordinate system, it is possible to compute the rotation amount R and the translation amount T.

Herein, the conversion amount computation unit 63 computes a rotation amount R1 when a straight line Y passing through the point b1 and the point b2 is converted to a straight line parallel to a straight line X passing through the point a1 and the point a2. The conversion amount computation unit 63 computes an inner product between a vector indicating the straight line X and a vector indicating the straight line Y, thereby computing an angle between the straight line X and the straight line Y. This allows the conversion amount computation unit 63 to compute the rotation amount R1.

The conversion amount computation unit 63 computes a rotation amount R2 when a straight line Y' passing through the point b2 and the point b3 is converted to a straight line parallel to a straight line X' passing through the point a2 and the point a3, as in the case of the rotation amount R1.

Herein, two values having different rotation directions are computed, as each of the rotation amount R1 and the rotation amount R2. Then, the conversion amount computation unit 63 selects, among pairs each constituted from one of the two values computed as the rotation amount R1 and one of the two values computed as the rotation amount R2, a pair having close values, and sets the pair as the rotation amount R1 and the rotation amount R2. In other words, let us assume that two values R1a and R1b have been computed as the rotation amount R1 and two values R2a and R2b have been computed as the rotation amount R2. In this case, as the pairs each constituted from the rotation amount R1 and the rotation amount R2, there are four pairs that are the pair of the R1a and the R2a, the pair of the R1a and the R2b, the pair of the R1b and the R2a, and the pair of the R1b and the R2b. The conversion amount computation unit 63 selects the pair whose values are close to each other, and sets the pair as the rotation amount R1 and the rotation amount R2. Then, the conversion amount computation unit 63 sets the mean value of the rotation amount R1 and the rotation amount R2 that have been selected, as the rotation amount R.

Subsequently, the conversion amount computation unit 63 generates an equation where the rotation amount R has been substituted into Expression 1. The conversion amount computation unit 63 generates Equation 1 where coordinate values x, y, and z of the point a1 have been respectively substituted into x', y', z' in the expression and coordinate values x, y, z of the point b1 have been respectively substituted into x", y", and z" in the expression. Similarly, the conversion amount computation unit 63 generates Equation 2 where coordinate values x, y, and z of the point a2 have been respectively substituted into x', y', z' in the expression and coordinate values x, y, z of the point b2 have been respectively substituted into x", y", and z" in the expression. The conversion amount computation unit 63 generates Equation 3 where coordinate values x, y, and z of the point a3 have been respectively substituted into x', y', z' in the expression and coordinate values x, y, z of the point b3 have been respectively substituted into x", y", and z" in the expression. The conversion amount computation unit 63 computes the translation amount T by using the Equations 1, 2 and 3 as simultaneous equations.

In an attribute determination process in S207, the target point extraction unit 61 determines whether all the attributes have been selected in S201.

If all the attributes have been selected (YES in S207), the target point extraction unit 61 causes the procedure to proceed to S208. On the other hand, if there is any attribute that has not been selected (NO in S207), the target point extraction unit 61 returns the procedure to S201, and selects the attribute that has not been selected.

In an error determination process in S208, the conversion amount computation unit 63 determines whether a difference among candidates for the conversion amount 67 with respect to the respective attributes computed in S206 is equal to or less than a threshold value. It is assumed that the threshold value is stored in the storage device of the driving support apparatus 10 in advance.

If the difference is equal to or less than the threshold value (YES in S208), the conversion amount computation unit 63 causes the procedure to proceed to S209. On the other hand, if the difference is not equal to or less than the threshold value (NO in S208), the conversion amount computation unit 63 returns the procedure to S201. If the procedure has been returned to S201, the target point extraction unit 61 selects a plurality of the attributes though only one attributes has been selected so far.

In a conversion amount determination process in S209, the conversion amount computation unit 63 determines the rotation amount R and the translation amount T that are the conversion amount 67, using the candidates for the conversion amount 67 with respect to the respective attributes computed in S206.

Herein, the conversion amount computation unit 63 computes the mean value of the candidates for the conversion amount 67 with respect to the respective attributes computed in S206, thereby determining the conversion amount 67. The conversion amount computation unit 63 may determine the conversion amount 67 by a different method such as determining the conversion amount 67 by selecting the candidate for the conversion amount 67 with respect to one of the attributes.

In a converted map generation process in S210, the coordinate conversion unit 64 converts the positions of the respective points included in the second map 53 using the rotation amount R and the translation amount T that are the conversion amount 67 determined in S209, thereby generating the converted map 54.

The likelihood computation process in S203 will be described in detail.

Three examples A to C will be each described as the likelihood computation process in S203. The likelihood computation unit 62 executes one or more of the A to C.

\*\*\*Configuration of Likelihood Computation Unit 62 when Executing Likelihood Computation Process A\*\*\*

Figure 9:
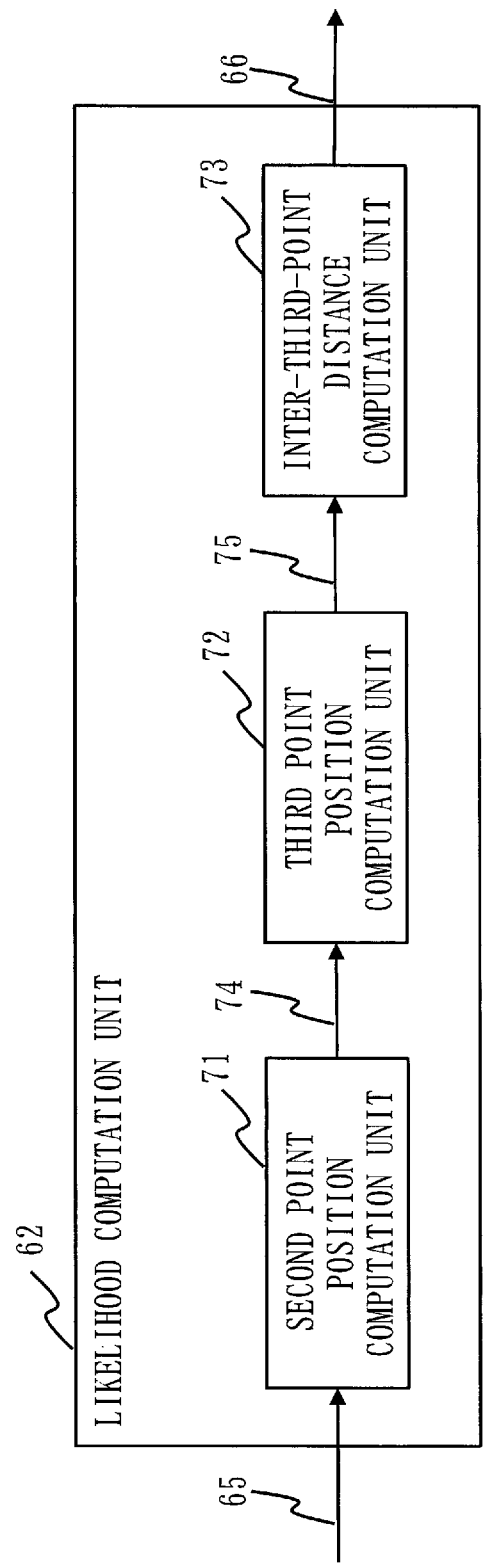
FIG. 9 is a configuration diagram of a likelihood computation unit 62 when executing a likelihood computation process A.

FIG. 9 is a configuration diagram of the likelihood computation unit 62 when executing the likelihood computation process A.

The likelihood computation unit 62 includes a second point position computation unit 71, a third point position computation unit 72, and an inter-third-point distance computation unit 73.

The second point position computation unit 71 places the point b1 at a position that is the same as the point a1, in the first coordinate system. Then, the second point position computation unit 71 computes a position 74 of the point b2 when the point b2 is placed on the straight line X passing through the point a1 and the point a2, using a distance b12 between the point b1 and b2.

The third point position computation unit 72 computes a straight line Z in the first coordinate system obtained by moving a straight line Y passing through the point a2 and the point a3 in parallel so that the straight line Y passes through the position 74 of the point b2 computed by the second point position computation unit 71. The third point position computation unit 72 computes a position 75 of the point b3 when the point b3 is placed on the computed straight line Z, using a distance 23 between the point b2 and the point b3.

The inter-third-point distance computation unit 73 computes a distance ab3 between the position 75 of the point b3 computed by the third point position computation unit 72 and the point a3, as the likelihood 66.

\*\*\*Operations of Likelihood Computation Unit 62 when Executing Likelihood Computation Process A\*\*\*

Figure 10:
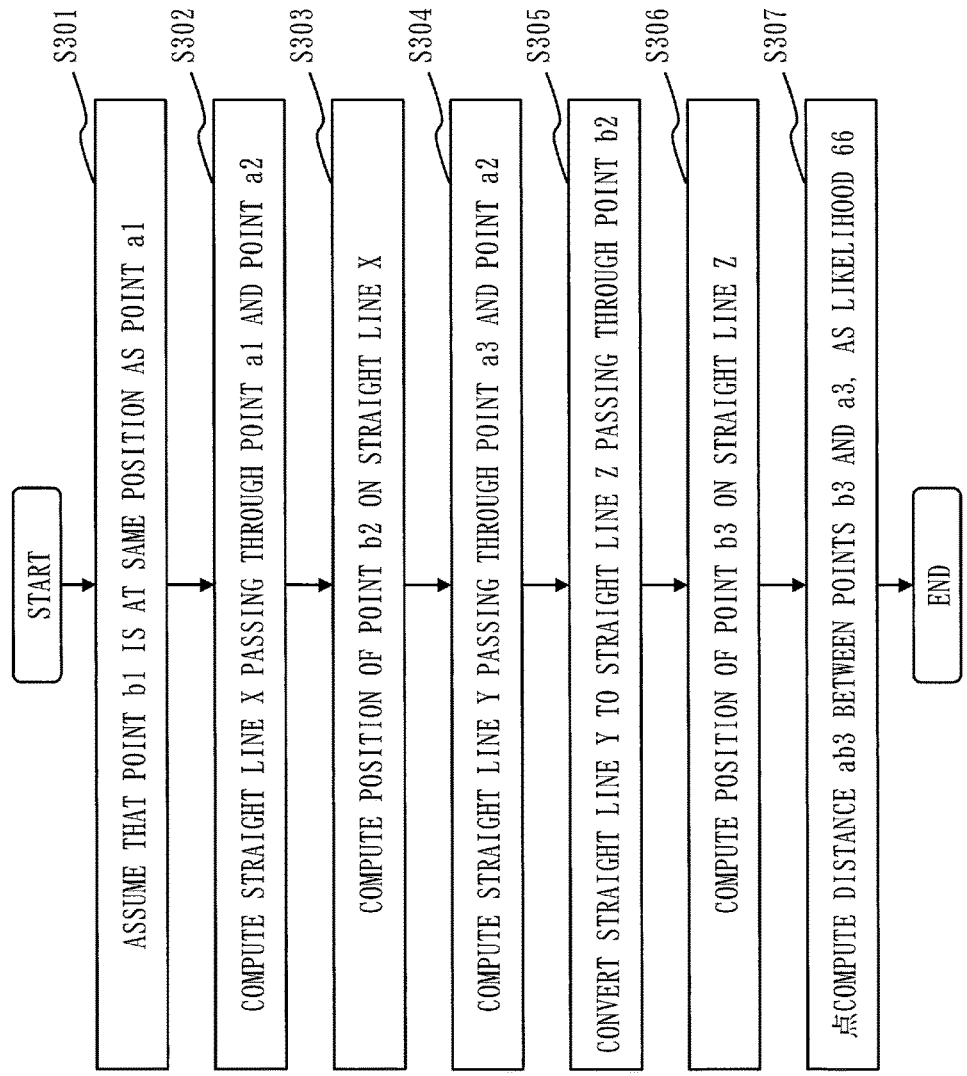
FIG. 10 is a flowchart illustrating operations of the likelihood computation unit 62 when executing the likelihood computation process A.

FIG. 10 is a flowchart illustrating operations of the likelihood computation unit 62 when executing the likelihood computation process A.

Figure 11:
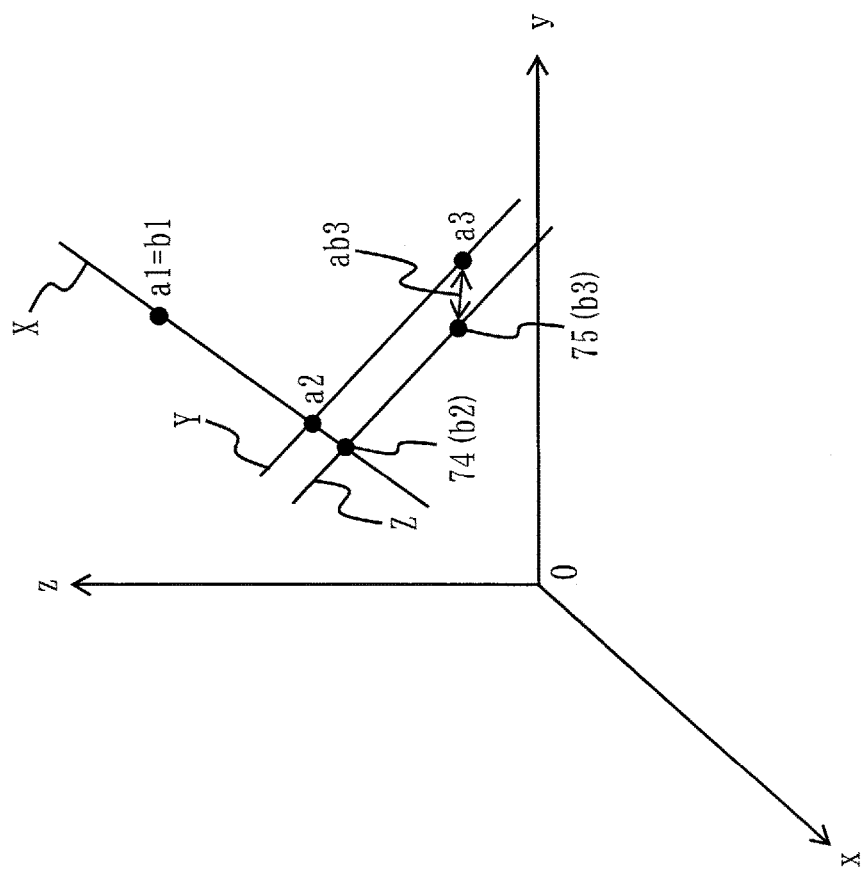
FIG. 11 is an explanatory diagram of the likelihood computation process A.

The likelihood computation process A will be described, with reference to FIG. 11.

In a point b1 setting process in S301, the second point position computation unit 71 sets the point b1 at the position that is the same as the point a1 in the first coordinate system, assuming that the point b1 is at the same position as the point a1.

In a straight line X computation process in S302, the second point position computation unit 71 computes the straight line X passing through the point a1 and the point a2, based on the position of the point a1 and the position of the point a2.

In a point b2 computation process in S303, the second point position computation unit 71 computes the position 74 of the point b2 when the point b2 is placed on the straight line X computed in S302, using the distance b12 between the point b1 and the point b2. That is, the second point position computation unit 71 computes a position on the straight line X separated from the position of the b1 set in S301 just by the distance b12, as the position 74 of the point b2.

The distance b12 between the point b1 and the point b2 can be computed, using the position of the point b1 and the position of the b2 in the second coordinate system.

In a straight line Y computation process in S304, the third point position computation unit 72 computes the straight line Y passing through the point a2 and the point a3, using the position of the point a2 and the position of the point a3.

In a straight line Z computation process in S305, the third point position computation unit 72 moves the straight line Y computed in S304 in parallel so that the straight line Y passes through the position 74 of the point b2 computed in S303, thereby converting the straight line Y to the straight line Z.

In a point b3 computation process in S306, the third point position computation unit 72 computes the position 75 of the point b3 when the point b3 is placed on the straight line Z obtained by the conversion in S305, using the distance b23 between the point b2 and the point b3. That is, the third point position computation unit 72 computes the position on the straight line Z separated from the position of the point b2 computed in S303 just by the distance b23, as the position 75 of the point b3. The distance b23 between the point b2 and the point b3 can be computed from the position of the point b2 and the position of the point b3 in the second coordinate system.

In a distance computation process in S307, the inter-third-point distance computation unit 73 computes the distance ab3 between the position 75 of the point b3 computed in S306 and the point a3, as the likelihood 66.

Figure 12:
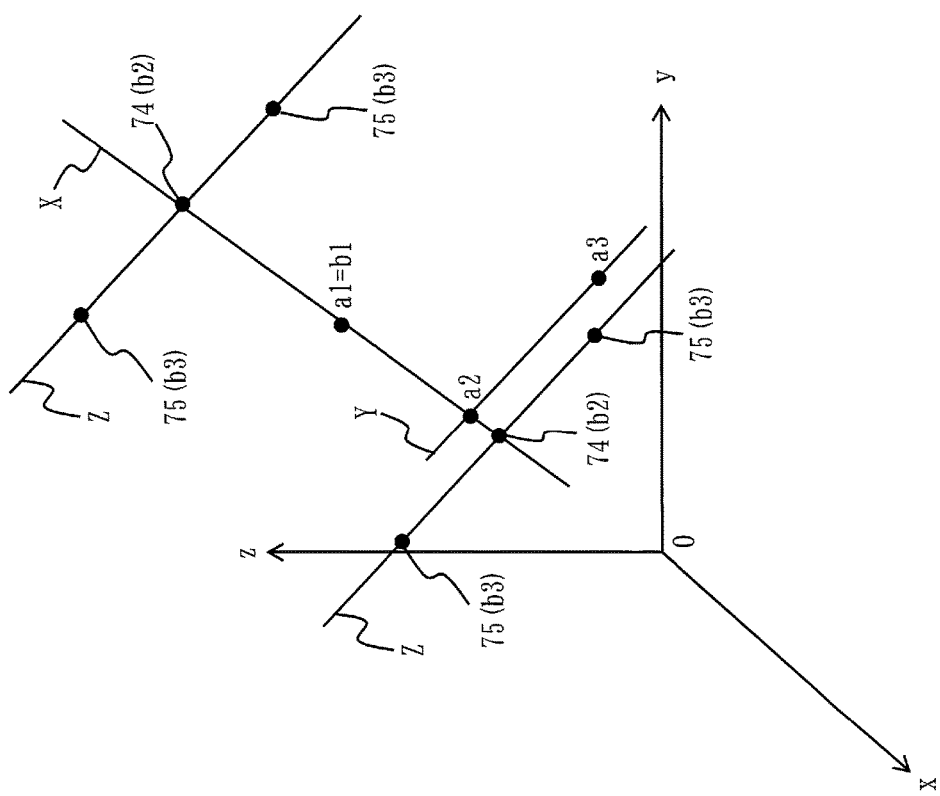
FIG. 12 is an explanatory diagram of the likelihood computation process A.

As illustrated in FIG. 12, there are two positions 74 of the point b2 to be computed in S303. Then, for each position 74 of the point b2, there are two positions 75 of the point b3 to be computed in S306. Therefore, a total of four positions 75 of the point b3 are to be computed in S306.

In S307, the inter-third-point distance computation unit 73 computes the distance ab3 between each of the four positions 75 computed in S306 and the point a3. Then, the inter-third-point distance computation unit 73 sets, as the likelihood 66, a shortest distance ab3 of four distances ab3 that have been computed.

\*\*\*Configuration of Likelihood Computation Unit 62 when Executing Likelihood Computation Process B\*\*\*

Figure 13:
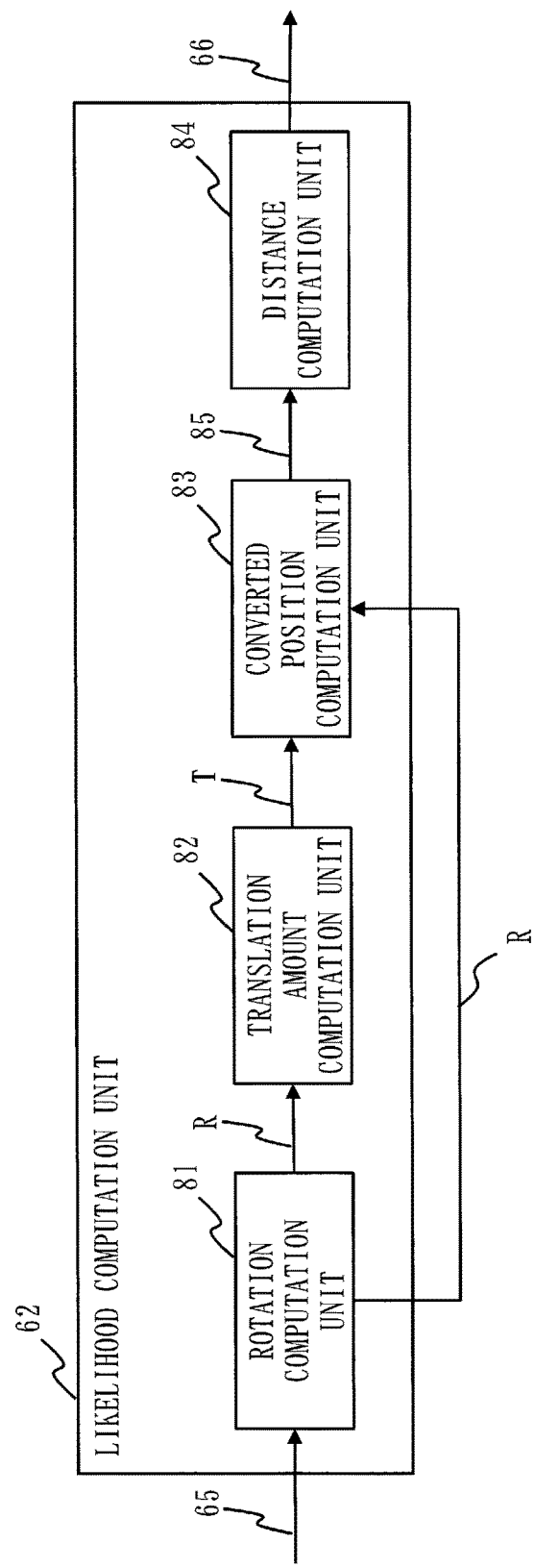
FIG. 13 is a configuration diagram of the likelihood computation unit 62 when executing a likelihood computation process B.

FIG. 13 is a configuration diagram of the likelihood computation unit 62 when executing the likelihood computation process B.

The likelihood computation unit 62 includes a rotation computation unit 81, a translation amount computation unit 82, a converted position computation unit 83, and a distance computation unit 84.

The rotation computation unit 81 computes a rotation amount R when the straight line Y passing through the point b1 and the point b2 in the second coordinate system is converted to the line parallel to the straight line X passing through the point a1 and a2 in the first coordinate system.

The translation amount computation unit 82 computes a translation amount T in a conversion amount 67 when the rotation amount R in the conversion amount 67 for matching the second coordinate system to the first coordinate system is assumed to be the rotation amount R computed by the rotation computation unit 81.

The converted position computation unit 83 computes positions of the point b1, the point b2, and the point b3 in the first coordinate system as converted positions 85, based on the rotation amount R computed by the rotation computation unit 81 and the translation amount T computed by the translation amount computation unit 82. That is, the converted position computation unit 83 computes moved positions of the point b1, the point b2, and the point b3 as the converted positions 85, using the rotation amount R and the translation amount T.

The distance computation unit 84 computes a distance ab1 between the point a1 and the converted position 85 of the point b1 computed by the converted position computation unit 83. The distance computation unit 84 computes a distance ab2 between the point a2 and the converted position 85 of the point b2 computed by the converted position computation unit 83. The distance computation unit 84 computes a distance ab3 between the point a3 and the converted position 85 of the point b3 computed by the converted position computation unit 83. Then, the distance computation unit 84 computes the sum of the distance ab1, the distance ab2, and the distance ab3, as the likelihood 66.

\*\*\*Operations of Likelihood Computation Unit 62 when Executing Likelihood Computation Process B\*\*\*

Figure 14:
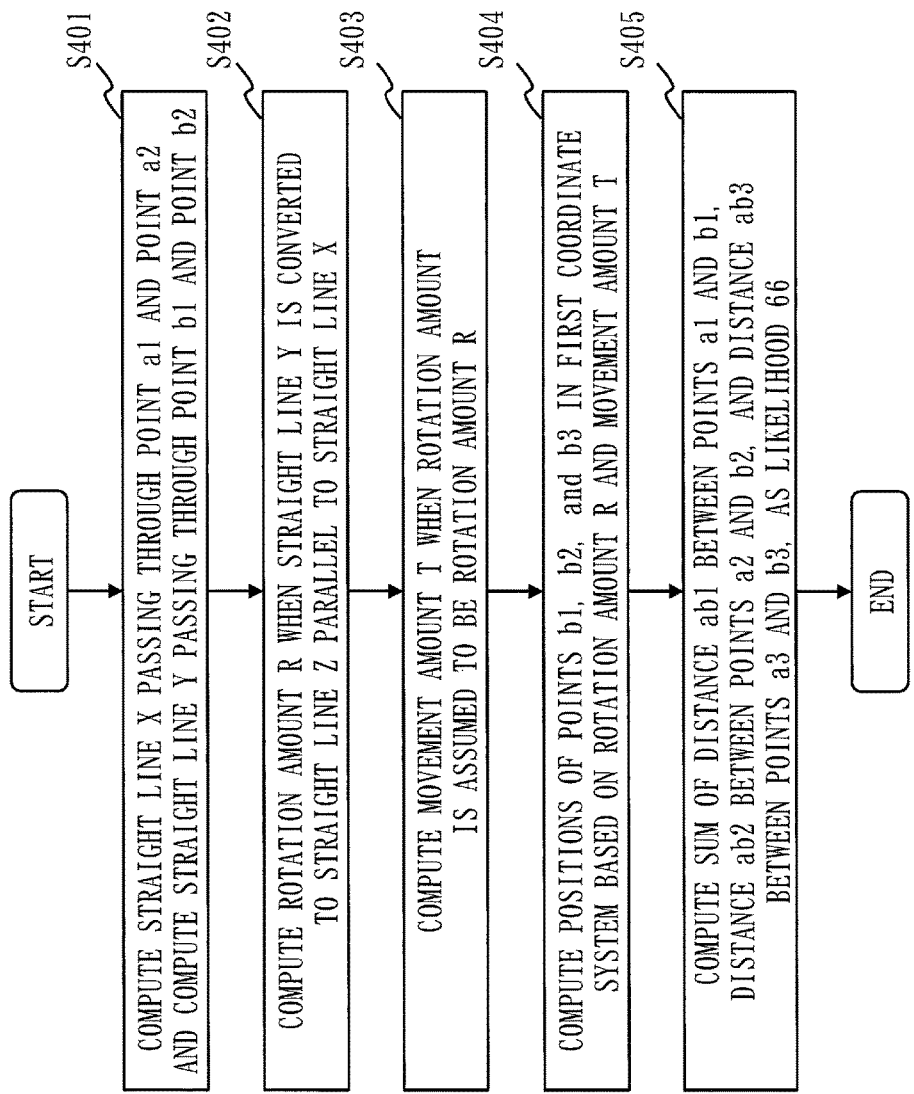
FIG. 14 is a flowchart illustrating operations of the likelihood computation unit 62 when executing the likelihood computation process 13.

FIG. 14 is a flowchart illustrating operations of the likelihood computation unit 62 when executing the likelihood computation process B.

The likelihood computation process B will be described, with reference to FIGS. 15 and 16.

Figure 15:
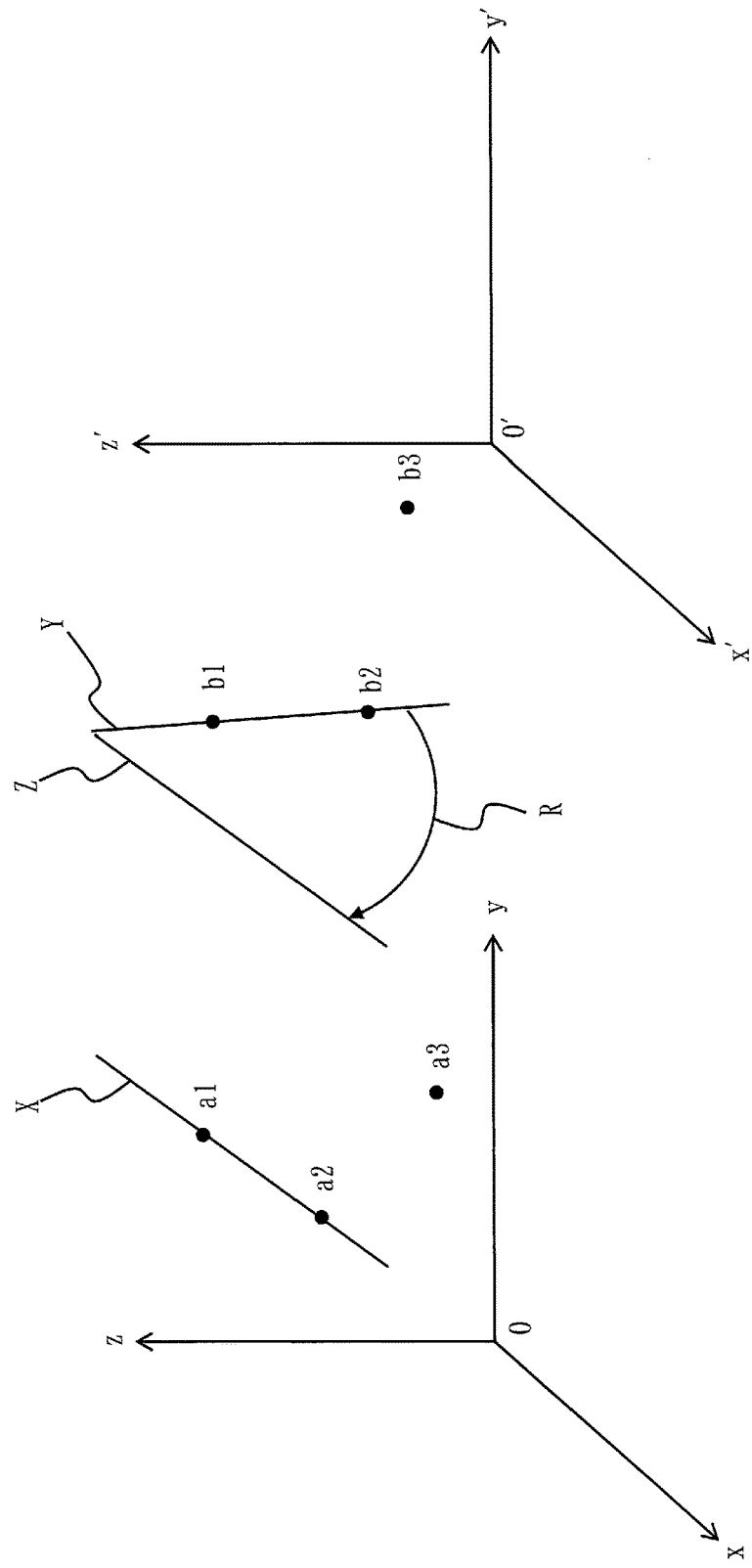
FIG. 15 includes explanatory diagrams of the likelihood computation process 13.

In a straight line computation process in S401, the rotation computation unit 81 computes the straight line X passing through the point a1 and the point a2 in the first coordinate system and the straight line Y passing through the point b1 and the point b2 in the second coordinate system, as illustrated in FIG. 15.

In a rotation computation process in S402, the rotation computation unit 81 computes the rotation amount R when the straight line Y computed in S401 is converted to a straight line Z parallel to the straight line X computed in S401, as illustrated in FIG. 15.

The specific computation method of the rotation amount R is the same as the method of computing the rotation amount R by the conversion amount computation unit 63 in S206.

In a movement amount computation process in S403, the translation amount computation unit 82 assumes that the rotation amount R in the conversion amount 67 for matching the second coordinate system to the first coordinate system is the rotation amount R computed by the rotation computation unit 81. Then, the translation amount computation unit 82 computes the translation amount T in the conversion amount 67 in this case.

The specific computation method of the translation amount T is the same as the method of computing the translation amount T by the conversion amount computation unit 63 in S206.

Figure 16:
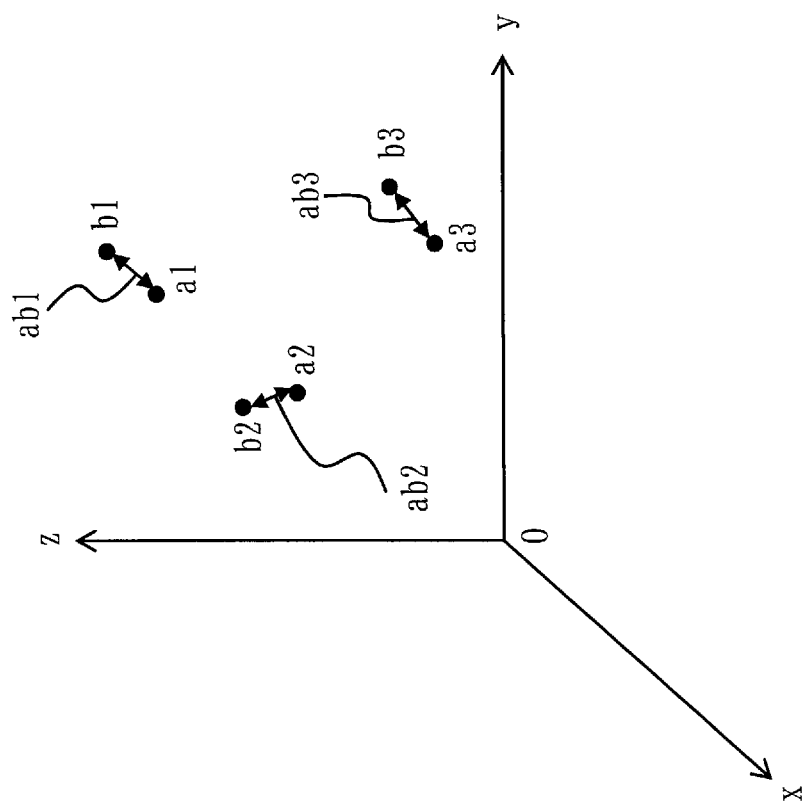
FIG. 16 is an explanatory diagram of the likelihood computation process B.

In a position computation process in S404, the converted position computation unit 83 computes the positions of the point b1, the point b2, and the point b3 in the first coordinate system as the converted positions 85, based on the rotation amount R computed in S402 and the translation amount computed in S403, as illustrated in FIG. 16.

In a distance computation process in S405, the converted position computation unit 83 computes the distance ab1 between the point a1 and the converted position 85 of the point b1 computed in S404, as illustrated in FIG. 16. The converted position computation unit 83 computes the distance ab2 between the point a2 and the converted position 85 of the point b2 computed in S404. The converted position computation unit 83 computes the distance ab3 between the point a3 and the converted position 85 of the point b3 computed in S404. Then, the distance computation unit 84 computes the sum of the distance ab1, the distance ab2, and the distance ab3, as the likelihood 66.

Figure 17:
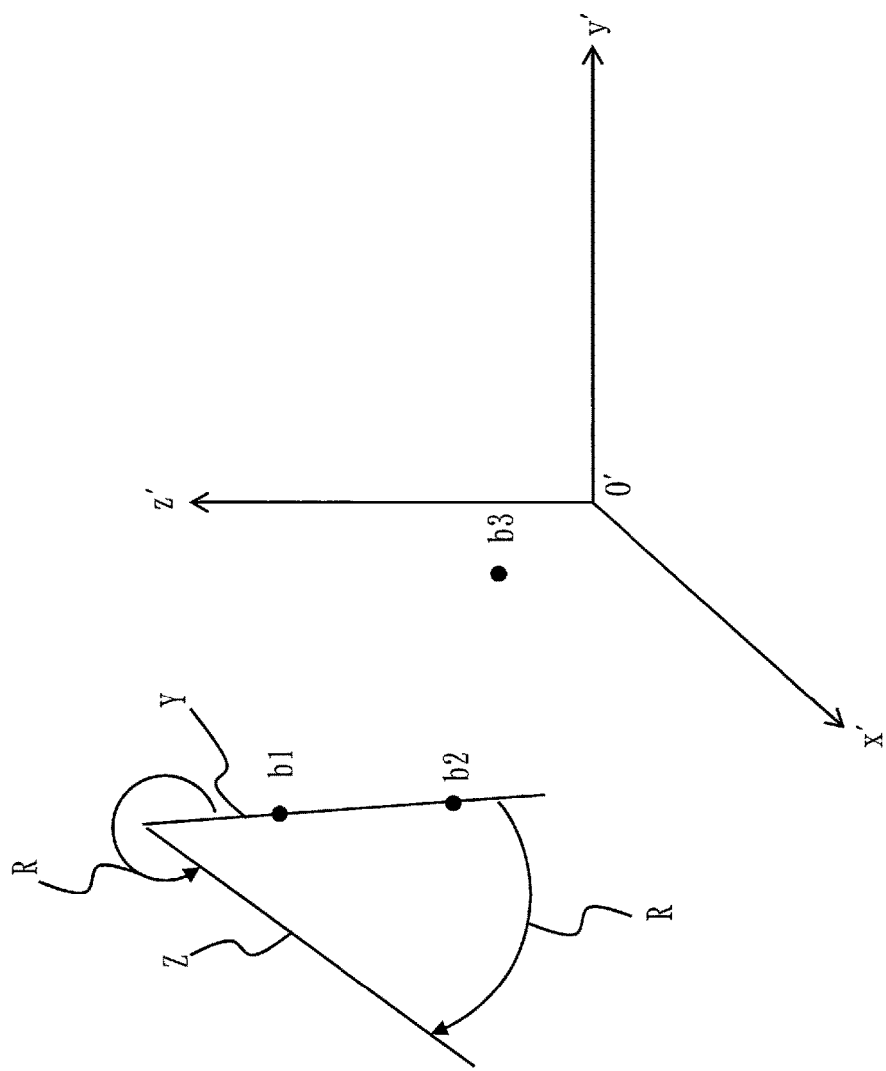
FIG. 17 includes explanatory diagrams of the likelihood computation process B.

As illustrated in FIG. 17, there are two rotation amounts R to be computed in S402. Therefore, in S403, the translation amount T is computed for each of the two rotation amounts R. In S404, two converted positions 85 are computed for each of the point b1, the point b2, and the point b3.

In S405, the converted position computation unit 83 computes the sum of the distances for each of the two converted positions 85 computed in S404. Then, the converted position computation unit 83 sets, as the likelihood 66, one of two sums of the distances that have been computed having a smaller value.

*Configuration of Likelihood Computation Unit 62 when Executing Likelihood Computation Process C*

Figure 18:
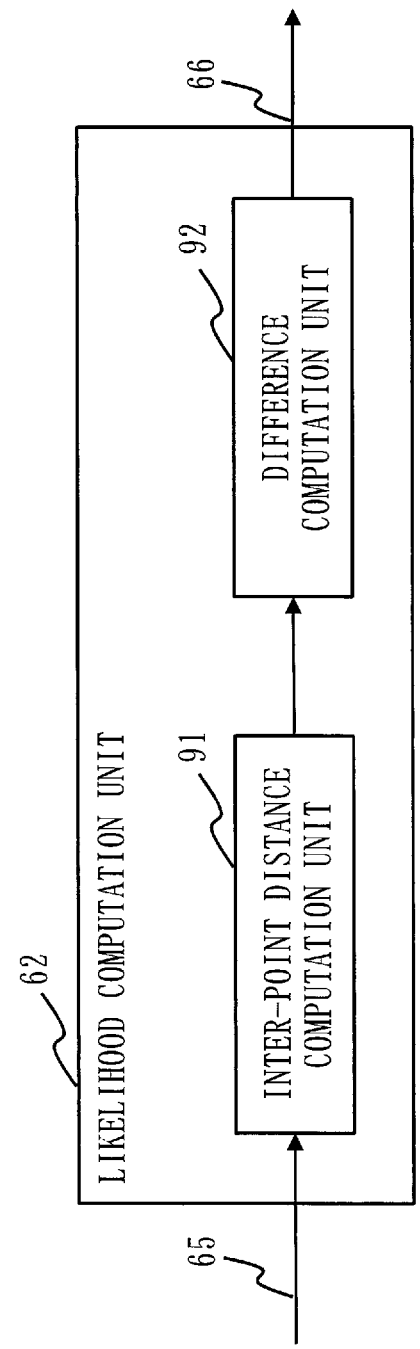
FIG. 18 is a configuration diagram of the likelihood computation unit 62 when executing a likelihood computation process C.

FIG. 18 is a configuration diagram of the likelihood computation unit 62 when executing the likelihood computation process C The likelihood computation unit 62 includes an inter-point distance computation unit 91 and a difference computation unit 92.

The inter-point distance computation unit 91 computes a distance a12 between the point a1 and the point a2, a distance a23 between the point a2 and the point a3, a distance a13 between the point a1 and the point a3, a distance b12 between the point b1 and the point b2, a distance b23 between the point b2 and the point b3, and a distance b13 between the point b1 and the point b3.

The difference computation unit 92 computes the sum of a difference between the distance a12 and the distance b12, a difference between the distance a23 and the distance b23, and a difference between the distance a13 and the distance b13, as the likelihood 66.

*Operations of Likelihood Computation Unit 62 when Executing Likelihood Computation Process C*

Figure 19:
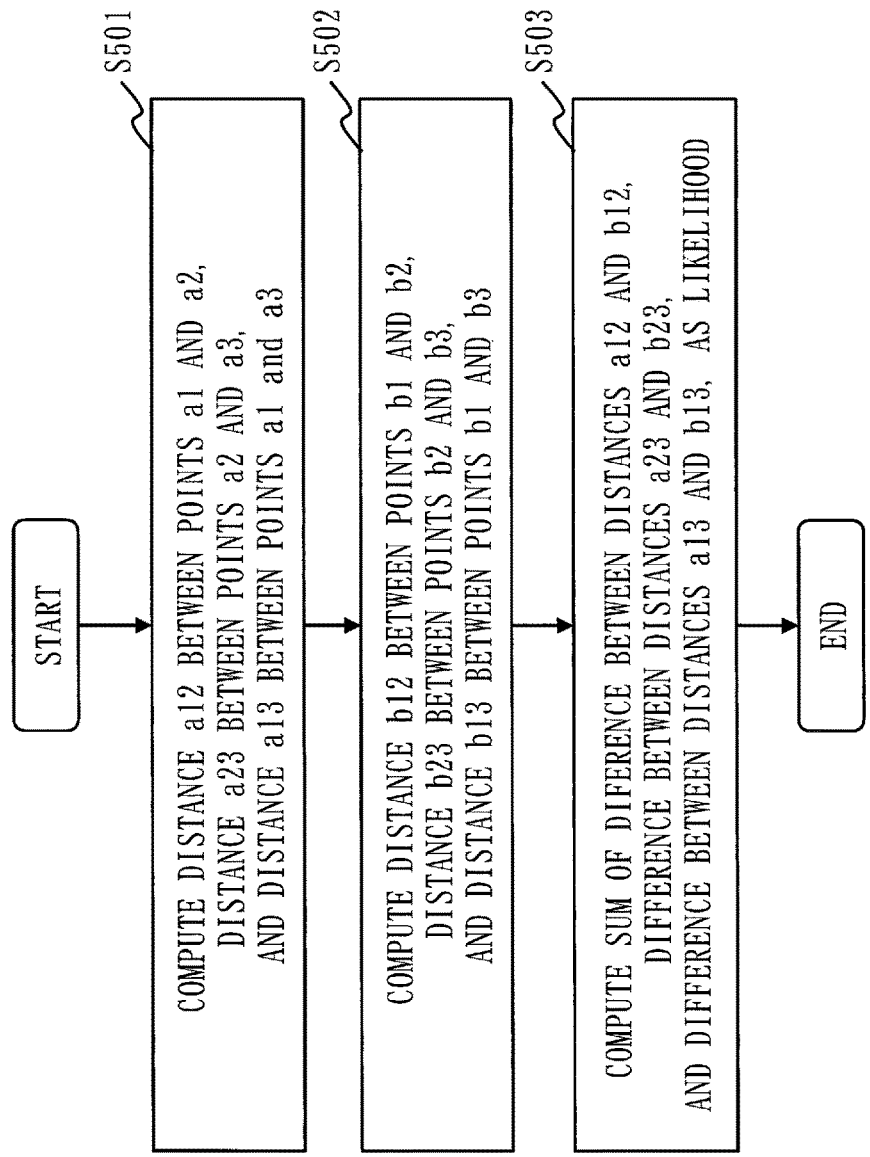
FIG. 19 is a flowchart illustrating operations of the likelihood computation unit 62 when executing the likelihood computation process C.

FIG. 19 is a flowchart illustrating operations of the likelihood computation unit 62 when executing the likelihood computation process C.

Figure 20:
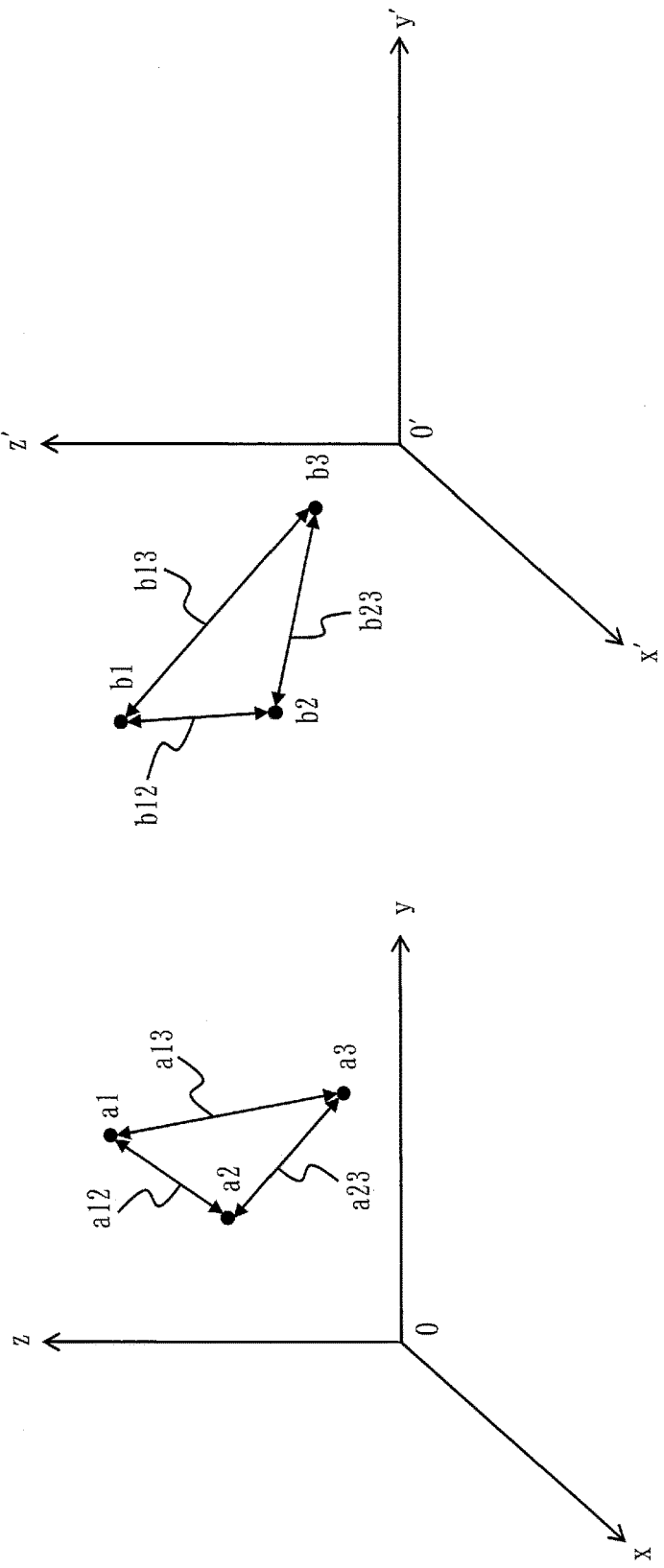
FIG. 20 includes explanatory diagrams of the likelihood computation process C.

The likelihood computation process C will be described with reference to FIG. 20.

In an inter-first-point distance computation process in S501, the inter-point distance computation unit 91 computes the distance a12 between the point a1 and the point a2, the distance a23 between the point a2 and the point a3, and the distance a13 between the point a1 and the point a3.

In an inter-second-point distance computation process in S502, the inter-point distance computation unit 91 computes the distance b12 between the point b1 and the point b2, the distance b23 between the point b2 and the point b3, and the distance b13 between the point b1 and the point b3.

In a difference computation process in S503, the difference computation unit 92 computes the sum of the difference between the distance a12 and the distance b12, the difference between the distance a23 and the distance b23, and the difference between the distance a13 and the distance b13, as the likelihood 66.

*Effects of First Embodiment*

As mentioned above, the driving support system 1 converts the second map 53 of the objects around the external apparatus 200 to the converted map 54 in the first coordinate system for the first map 43 of the objects around the vehicle 100. Then, the driving support system 1 synthesizes the converted map 54 into the first map 43, thereby generating the composite map 44.

This causes the composite map 44 to become a three-dimensional map in which the range of the first map 43 indicating the objects around the vehicle 100 is expanded and the positions of one or more of the objects indicated in the second map 53 that cannot be detected by the sensor 31 of the vehicle 100 are also correctly displayed. Since the positions of the objects are correctly displayed, the composite map 44 can also be used for controlling travelling of the vehicle 100.

While there is no height information in a two-dimensional map, there is height information in a three-dimensional map. Therefore, presence or absence of objects such as a step and a viaduct with heights can be determined, in the third-dimensional map. Further, if the composite map 44 is the three-dimensional map, an object such as a tree whose width changes according to its height can be appropriately handled.

*Alternative Configuration*

In the above description, the description has been given about the configuration in which the driving support system 1 includes one external apparatus 200.

The driving support system 1, however, may include a plurality of the external apparatuses 200.

In this case, the driving support apparatus 10 receives a second map 53 from the externally mounted apparatus 20 mounted on each external apparatus 200. Then, the driving support apparatus 10 synthesizes a plurality of the second maps 53 into the first map 43, thereby generating one composite map 44.

In the above description, the second map 53 has been converted to the converted map 54 in the first coordinate system for the first map 43, and the converted map 54 has been synthesized into the first map 43.

However, both of the first map 43 and the second map 53 may be converted into a certain third coordinate system, and the first map 43 and the second map 53 that have been converted may be synthesized. In this case, the coordinate synchronization unit 15 computes a conversion amount 67 from the first coordinate system to the third coordinate system as a conversion amount 67a, computes a conversion amount 67 from the second coordinate system to the third coordinate system as a conversion amount 67b, converts the first map 43 using the conversion amount 67a, and converts the second map 53 using the conversion amount 67b. Then, the synthesizing unit 16 synthesizes the converted first map 43 and the converted second map 53.

As a specific example of the certain coordinate system, an absolute coordinate system can be pointed out. The absolute coordinate system is a global coordinate system in which each position is represented by a latitude, a longitude, and an altitude.

In the above description, two of the first map 43 generated by the driving support apparatus 10 and the second map 53 generated by the externally mounted apparatus 20 have been synthesized to generate the composite map 44. There may be, however, a case where the driving support system 1 includes a vehicle 100' different from the vehicle 100, and a third map generated by the driving support apparatus 10' included in the vehicle 100' is synthesized, in addition to the first map 43 and the second map 53, to generate a composite map 44. Then, there may be a case where the composite map 44 is used by the driving support apparatus 10' as well as the driving support apparatus 10.

Assume in this case that the driving support apparatus 10 and the driving support apparatus 10' use the composite map 44 generated in the absolute coordinate system. Then, if one of the driving support apparatus 10 and the driving support apparatus 10' generates the composite map 44 in the absolute coordinate system, the other of the driving support apparatus 10 and the driving support apparatus 10' may just obtain the generated composite map 44. That is, by using a common coordinate system being the absolute coordinate system between the apparatuses, an overall processing amount of the driving support system 1 can be reduced. The more the number of the driving support apparatuses 10 included in the driving support system 1 is, the larger the effect of reducing the processing amount becomes.

In the above description, the driving support apparatus 10 has synthesized the first map 43 and the second map 53, thereby generating the composite map 44. However, the externally mounted apparatus 20 may synthesize the first map 43 and the second map 53, thereby generating the composite map 44, and may transmit the generated composite map 44 to the driving support apparatus 10. That is, the externally mounted apparatus 20 may execute the processes of the coordinate synchronization unit 15 and the synthesizing unit 16.

When the processing speed of the driving support apparatus 10 is slower than the processing speed of the externally mounted apparatus 20, the processes of the coordinate synchronization unit 15 and the synthesizing unit 16 can be executed at high speed by execution of the processes of the coordinate synchronization unit 15 and the synthesizing unit 16 by the externally mounted apparatus 20. Further, since a load on the driving support apparatus 10 can be reduced, hardware of the driving support apparatus 10 can be made inexpensive.

Further, as mentioned above, when the driving support apparatus 10 and the driving support apparatus 10' use the composite map 44 that is common, the externally mounted apparatus 20 may generate the composite map 44 and may transmit the generated composite map 44 to the driving support apparatus 10 and the driving support apparatus 10'.

Instead of the conversion of the second map 53 into the first coordinate system, conversion of the first map 43 into the second coordinate system may be performed. Then, the first map 43 obtained by the conversion and the second map 53 may be synthesized, thereby generating a composite map 44.

As mentioned above, when the driving support apparatus 10 and the driving support apparatus 10' use the composite map 44 that is common, the second coordinate system may be used as a common relative coordinate system. That is, the driving support apparatus 10 generates a composite map 44 in the second coordinate system from the first map 43 and the second map 53, and the driving support apparatus 10' generates a composite map 44' in the second coordinate system from the third map and the second map 53. Then, the driving support apparatus 10 acquires the composite map 44' and synthesizes the composite map 44' and the composite map 44. Similarly, the driving support apparatus 10' acquires the composite map 44, and synthesizes the composite map 44' and the composite map 44. This allows each of the driving support apparatus 10 and the driving support apparatus 10' to obtain the composite map in which the first map 43, the second map 53, and the third map have been synthesized.

Herein, both of the composite map 44' and the composite map 44 are represented by the second coordinate system. Therefore, when the composite map 44' and the composite map 44 are synthesized, coordinate conversion is not necessary. Accordingly, if each of the driving support apparatus 10 and the driving support apparatus 10' performs the coordinate conversion just once, the composite map in which the first map 43, the second map 53, and the third map have been synthesized can be obtained. That is, a processing amount of each of the driving support apparatus 10 and the driving support apparatus 10' for obtaining the composite map in which the first map 43, the second map 53, and the third map have been synthesized can be reduced. The more the number of the driving support apparatuses 10 included in the driving support system 1 becomes, the larger the effect of reducing the processing amount becomes.

In the above description, the attribute has been selected in S201 in FIG. 8, and the points represent the objects having the selected attribute have been set to the first and second specific points. This is because, unless the first and second specific points are the points representing the objects having the same attribute, it is unlikely that the first and second specific points become corresponding points between the first map 43 and the second map 53.

However, it is not necessary that all the target points 65 to be extracted in S202 in FIG. 8 should be the points representing the objects having the same attribute. It suffices that the corresponding points represent the objects having a same attribute. Specifically, the point a1 and the point b1 should be the points representing the objects having the same attribute, the point a2 and the point b2 should be the points representing the objects having the same attribute, and the point a3 and the point b3 should be the points representing the objects having the same attribute. Accordingly, it may be so arranged that the process in S201 is omitted and the target points 65 are extracted so that the corresponding points become the points representing the objects having the same attribute in S202.

In the above description, the description has been given, assuming that each of the first coordinate system and the second coordinate system is the orthogonal coordinate system.

Each of the first coordinate system and the second coordinate system, however, may be a polar coordinate system.

In the above description, the likelihood 66 with respect to each combination of the points representing the objects having the same attribute is computed in S202 to S204 in FIG. 8.

However, it may be so arranged that the likelihood 66 is computed with respect to only each combination of the points that are highly likely to correspond to each other. This can reduce a computation time for computing the likelihood 66.

The points that are highly likely to correspond to each other can be identified, using dispositions of the points in the first map 43 and the second map 53.

Specifically, when the likelihood computation process A illustrated in FIG. 10 is executed as the process in S203, the target point extraction unit 61 first extracts the point a1, the point a2, and the point b1 in S202. Then, the target point extraction unit 61 extracts, as the point b2, a point Q2 that makes a difference between the distance between the point a1 and the point a2 and the distance between the point b1 and the point Q2 smaller than a first reference value. If the distance between the point a1 and the point a2 and the distance between the point b1 and the point b2 are close, it is highly likely that the point a1 corresponds to the point b1 and the point a2 corresponds to the point b2. Therefore, by providing the condition of extracting the point b2 as mentioned above, the likelihood 66 can be computed for only the combination of the points that are highly likely to correspond to each other.

Further, the target point extraction unit 61 extracts the point a3, and extracts, as the point b3, a point Q3 that makes a difference between the distance between the point a2 and the point a3 and the distance between the point b2 and the point Q3 smaller than a second reference value. By providing the condition of extracting the point b3 as mentioned above as in the case where the point b2 has been extracted, the likelihood 66 can be computed for only the combination of the points that are highly likely to correspond to each other.

In the above description, three target points 65 have been set. However, an arbitrary number of the target points 65 may be set if three or more target points 65 are set.

Second Embodiment

A second embodiment is different from the first embodiment in that a first map 43 and a second map 53 are synthesized after times of the first map 43 and the second map 53 have been synchronized. In the second embodiment, this difference will be described.

\*\*\*Configuration of Driving Support System 1\*\*\*

Figure 21:
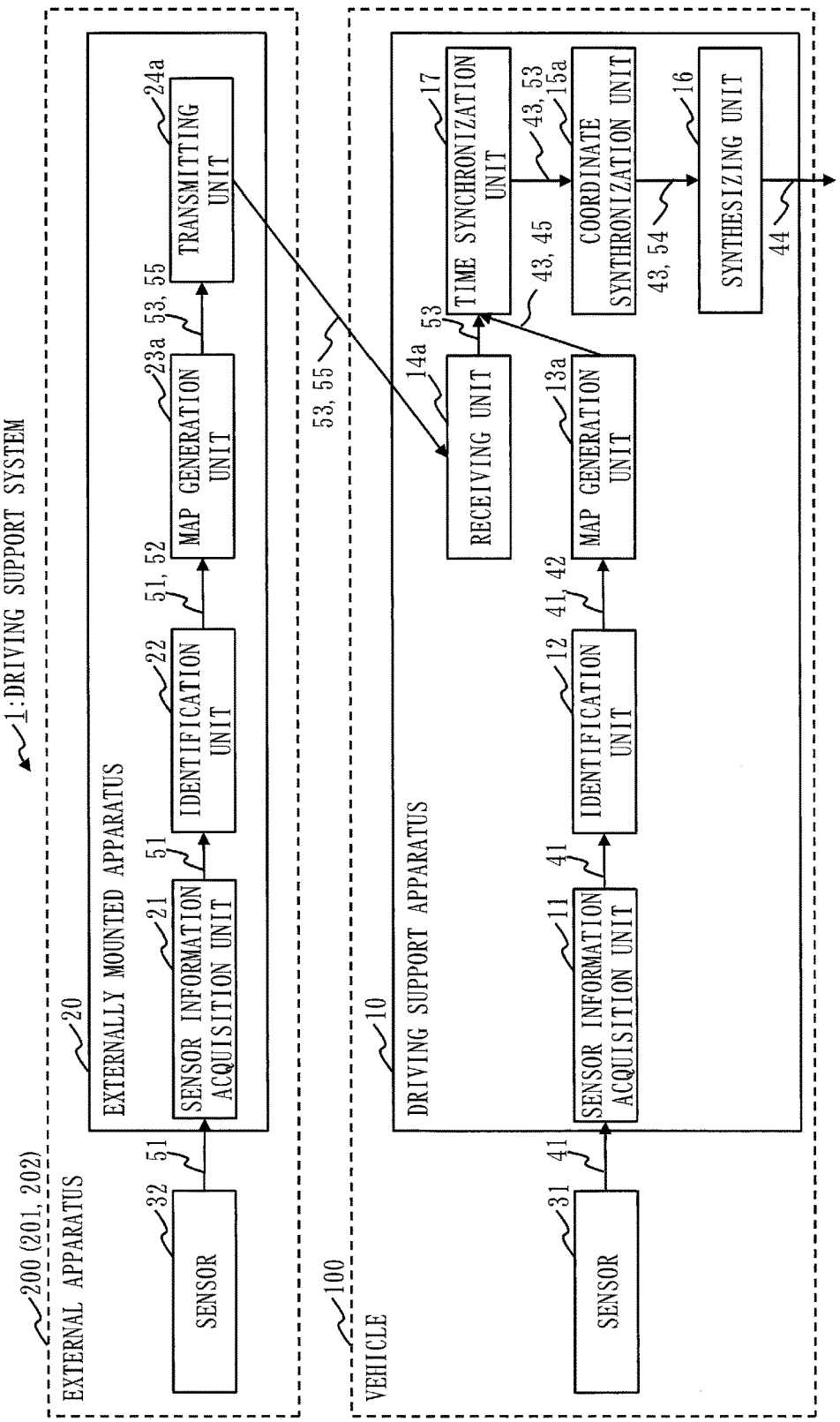
FIG. 21 is a configuration diagram of a driving support system 1 according to a second embodiment.

FIG. 21 is a configuration diagram of a driving support system 1 according to the second embodiment.

A driving support apparatus 10 includes, in addition to the configuration illustrated in FIG. 1, a time synchronization unit 17.

The sensor information acquisition unit 11 sequentially acquires sensor information 41. Then, the identification unit 12 identifies an attribute 42 of an object around the vehicle 100 for each sensor information 41, and a map generation unit 13a generates the first map 43 for each sensor information 41. In this case, the map generation unit 13a generates the first map 43 including a time stamp 45 indicating the acquisition time of the sensor information 41 used when the first map 43 is generated.

Similarly, the sensor information acquisition unit 21 sequentially acquires sensor information 51. Then, the identification unit 22 identifies an attribute 52 of an object around the external apparatus 200 for each sensor information 51, and a map generation unit 23a generates the second map 53 for each sensor information 51. In this case, the map generation unit 23a generates the second map 53 including a time stamp 55 indicating the acquisition time of the sensor information 51 used when the second map 53 is generated.

A transmitting unit 24a sequentially transmits, to the driving support apparatus 10, the second map 53 generated by the map generation unit 23a. A receiving unit 14a receives the second map 53 that has been sequentially transmitted.

The time synchronization unit 17 identifies the second map 53 of a same time as each first map 43 generated by the map generation unit 13a. The first map 43 and the second map 53 of the same time means that the sensor information 41 used for generating the first map 43 and the sensor information 51 used for generating the second map 53 have been acquired at the same time.

That is, the time synchronization unit 17 identifies, among a plurality of the second maps 53 received by the receiving unit 14a, the second map 53 generated from the sensor information 51 acquired at the same time as the acquisition time of the sensor information 41 used for generating the first map 43.

\*\*\*Operations of Driving Support System 1\*\*\*

Figure 22:
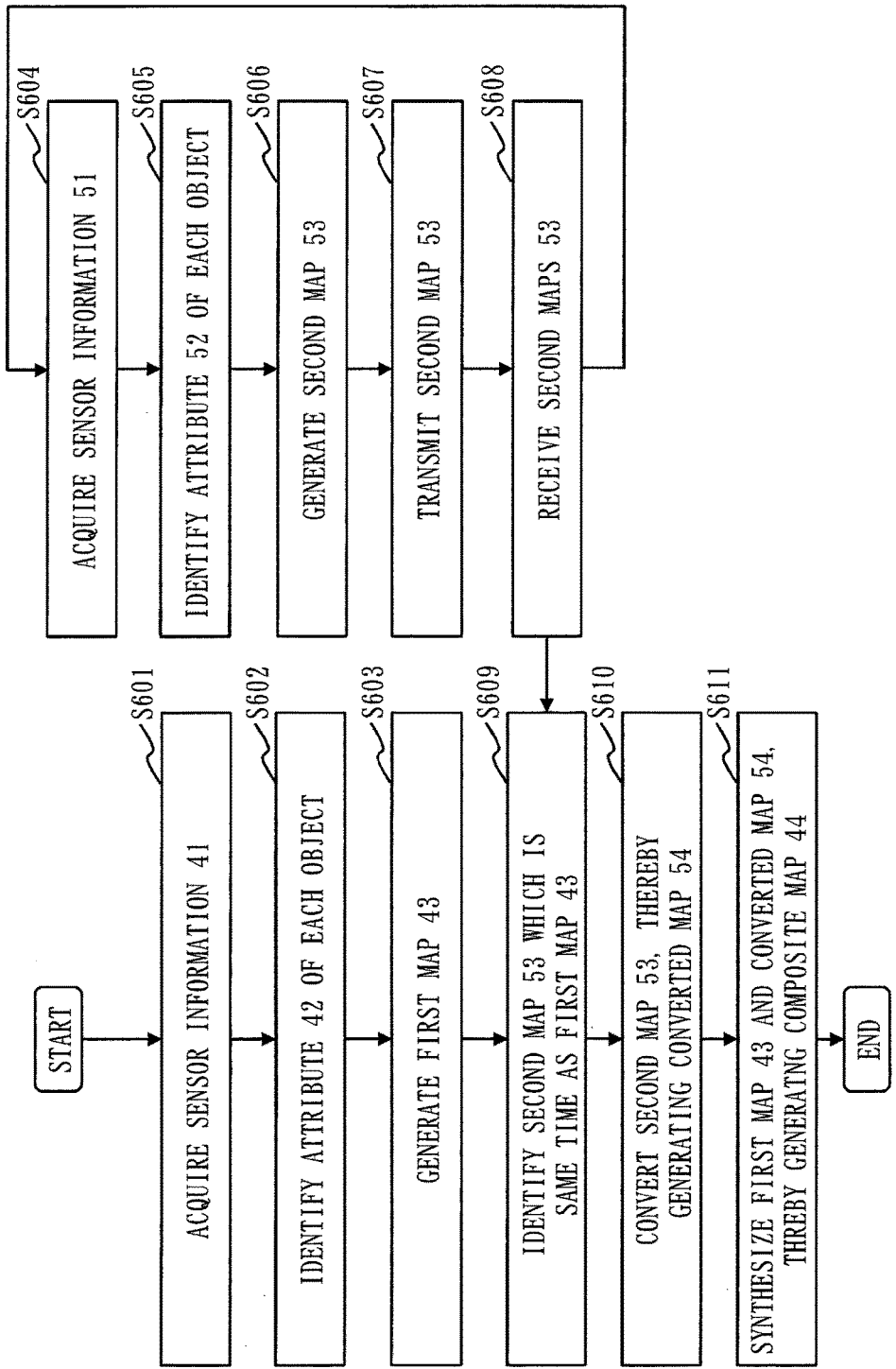
FIG. 22 is a flowchart illustrating operations of the driving support system 1 according to the second embodiment.

FIG. 22 is a flowchart illustrating operations of the driving support system 1 according to the second embodiment.

The operations of the driving support system 1 according to the second embodiment correspond to a driving support method according to the second embodiment. The operations of the driving support system 1 according to the second embodiment correspond to driving support program processes according to the second embodiment.

Processes from S601 to S608 are the same as the processes from S101 to S108 in FIG. 2. However, a first map 43 including a time stamp 45 is generated in S603, and a second map 53 including a time stamp 55 is generated in S606. Further, the processes from S604 to S608 are repeatedly executed, and a plurality of the second maps 53 are received in S608.

In a time synchronization process in S609, the time synchronization unit 17 identifies, among the plurality of the second maps 53 received in S608, the second map 53 generated from the sensor information 51 acquired at a same time as the acquisition time of the sensor information 41 used for generating the first map 43 generated in S 603.

Herein, the time synchronization unit 17 identifies the second map 53 including the time stamp 55 indicating the same acquisition time as the acquisition time indicated by the time stamp 45 included in the first map 43.

In a coordinate synchronization process in S610, the coordinate synchronization unit 15a converts the second map 53 so that a second coordinate system being the coordinate system of the second map 53 identified in S609 matches a first coordinate system being the coordinate system of the first map 43 generated in S603, thereby generating a converted map 54.

A process in S611 is the same as the process in S110 in FIG. 2.

\*\*\*Effects of Second Embodiment\*\*\*

As mentioned above, the driving support system 1 identifies, among the plurality of the second maps 53, the second map 53 of the same time as the first map 43. Then, the driving support system 1 synthesizes the identified second map 53 into the first map 43, thereby generating a composite map 44.

This makes the composite map 44 a three-dimensional map in which positions of objects at a certain time have been correctly displayed. Since the positions of the objects are correctly displayed, the composite map 44 can also be used for such a purpose as controlling travelling of a vehicle 100.

\*\*\*Alternative Configuration\*\*\*

In the above description, it has been assumed that the second map 53 of the same time as the first map 43 generated in S603 is received in S608. However, depending on a communication status, there may also be a case where the second map 53 cannot be temporarily received. Therefore, there may also occur a case where the second map 53 of the same time as the first map 43 generated in S603 is not received in S608.

Then, when there is not the second map 53 of the same time as the first map 43 generated in S603, the time synchronization unit 17 generates the second map 53 of the same time as the first map 43, using a plurality of the second maps 53 that have been received. Specifically, the time synchronization unit 17 estimates the second map 53 to be generated from the sensor information 51 acquired at the same time as the acquisition time of the sensor information 41 used for generation of the first map 43 generated in S603, using the plurality of the second maps 53 that have been received, and generates the second map 53.

Figure 23:
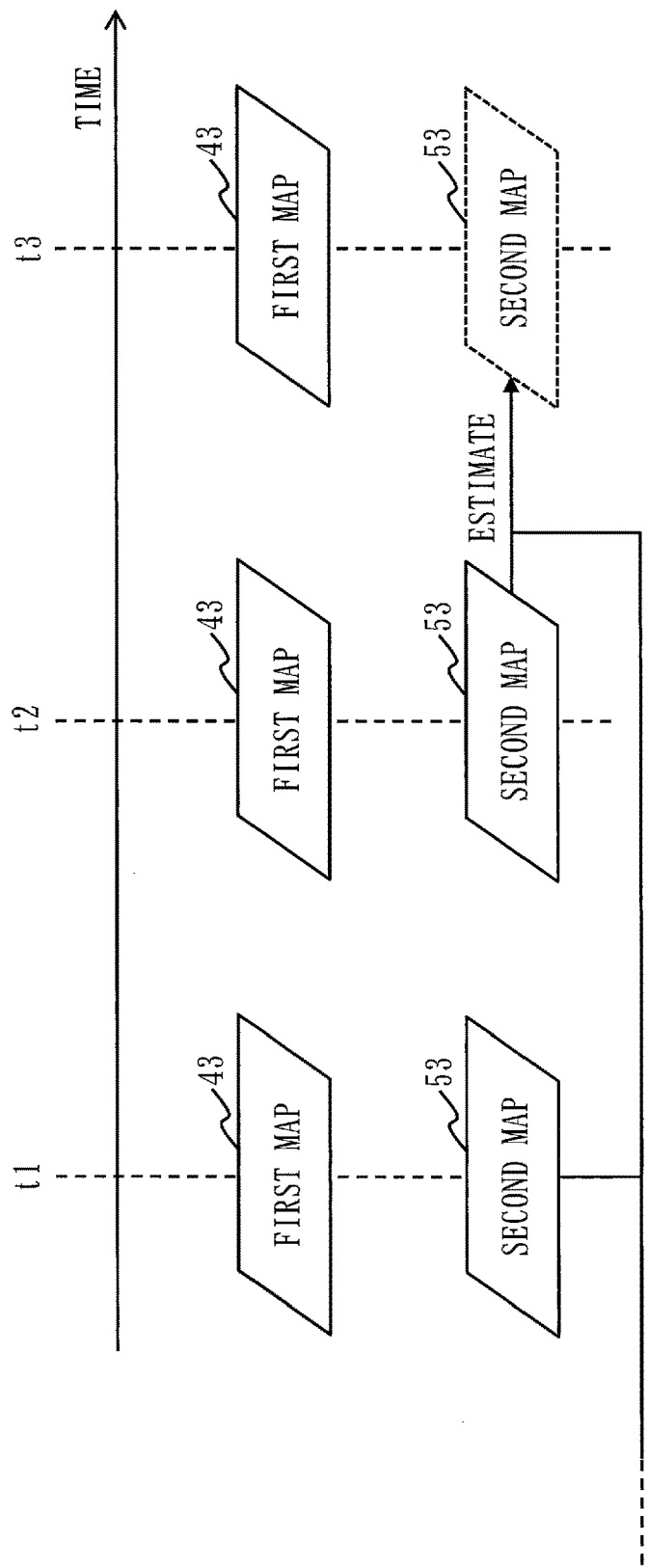
FIG. 23 is an explanatory diagram of a process of estimating a second map 53.

Herein, as illustrated in FIG. 23, using a Kalman filter, the time synchronization unit 17 estimates the second map 53 to be generated from the sensor information 51 acquired at the same time as the acquisition time of the sensor information 41, using the plurality of the second maps 53 that have been received in the past. In FIG. 23, the second map 53 to be generated from the sensor information 51 acquired at a time t3 is estimated, using the second maps 53 generated from the sensor information 51 acquired before the time t3.

Third Embodiment

A third embodiment is different from the first and second embodiments in that a driving support apparatus 10 generates a second map 53. In the third embodiment, this difference will be described.

Though the difference from the first embodiment will be herein described, the description can be similarly applied to the second embodiment as well.

\*\*\*Configuration of Driving Support System 1\*\*\*

Figure 24:
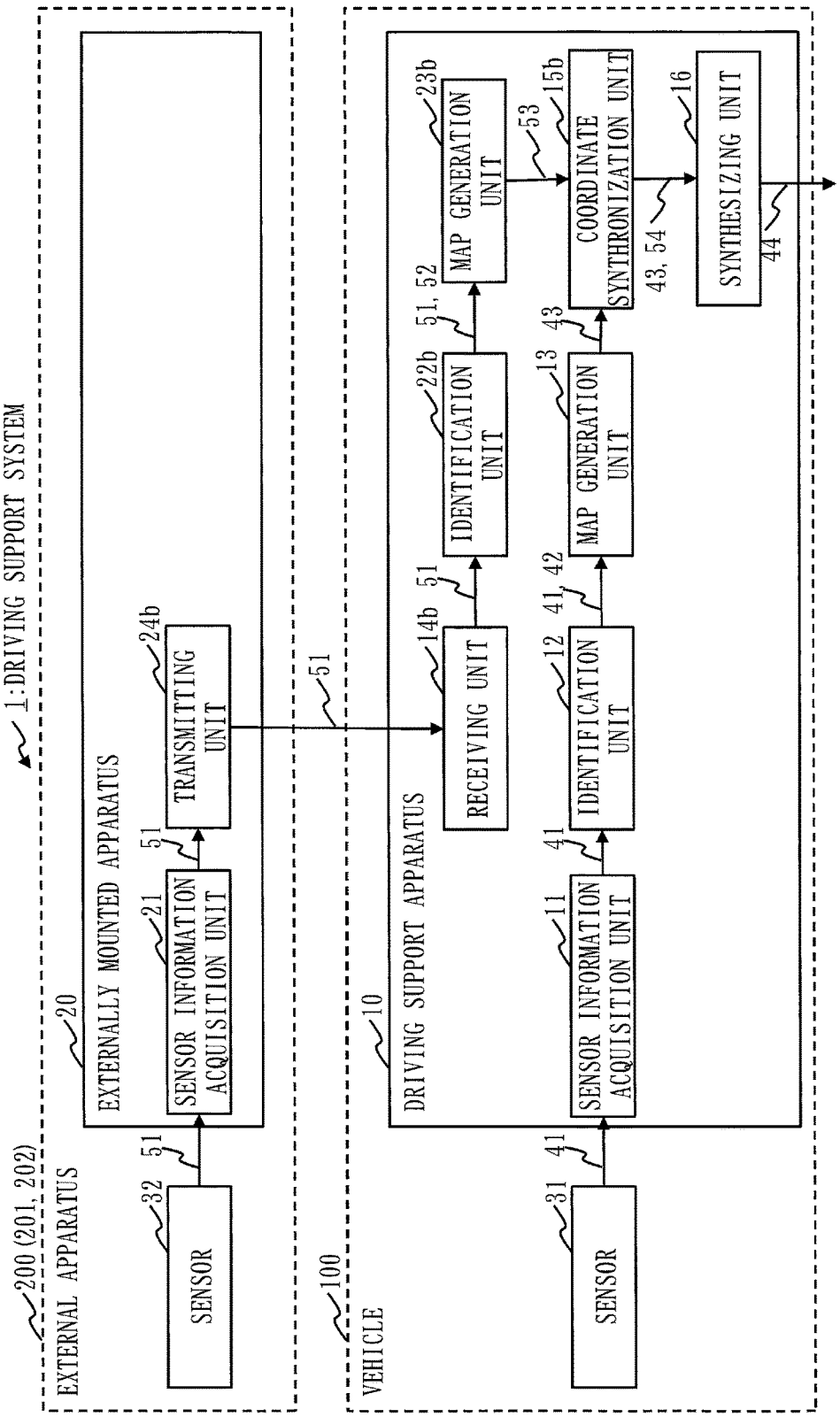
FIG. 24 is a configuration diagram of a driving support system 1 according to a third embodiment.

FIG. 24 is a configuration diagram of a driving support system 1 according to the third embodiment.

The driving support apparatus 10 includes, in addition to the configuration illustrated in FIG. 1, an identification unit 22*b* and a map generation unit 23*b*. On the other hand, an externally mounted apparatus 20 does not include the identification unit 22 and the map generation unit 23 in the configuration illustrated in FIG. 1.

A transmitting unit 24*b* transmits, to the driving support apparatus 10, sensor information 51 acquired by the sensor information acquisition unit 21. A receiving unit 14*b* receives the sensor information 51 transmitted by the transmitting unit 24*b*.

The identification unit 22*b* identifies an attribute 52 of each object around the external apparatus 200, based on the sensor information 51 received by the receiving unit 14*b*. The map generation unit 23*b* generates the second map 53, based on the sensor information 51 received by the receiving unit 14*b* and the attribute 52 of each object identified by the identification unit 22*b*.

\*\*\*Operations of Driving Support System 1\*\*\*

Figure 25:
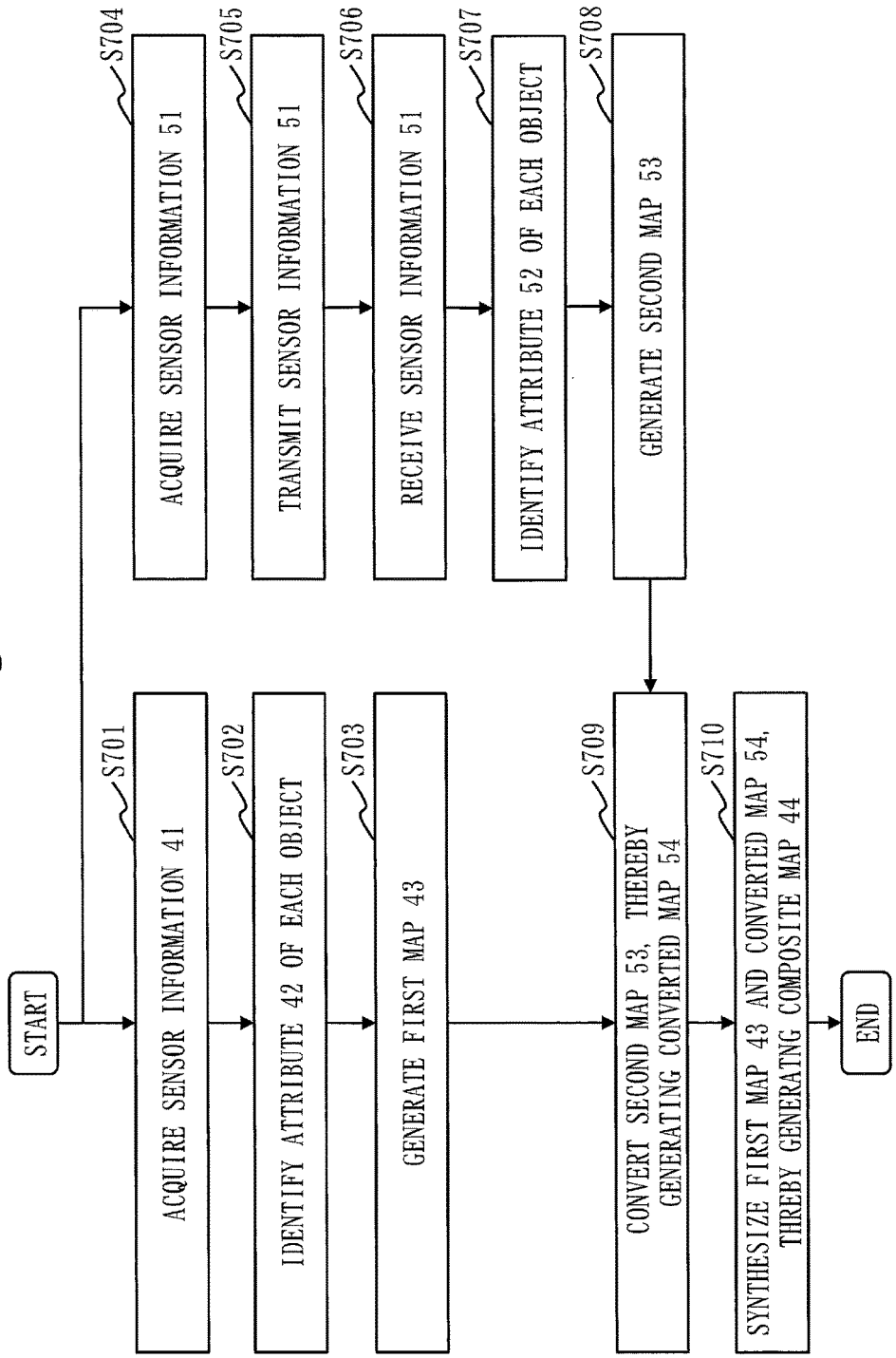
FIG. 25 is a flowchart illustrating operations of the driving support system 1 according to the third embodiment.

FIG. 25 is a flowchart illustrating operations of the driving support system 1 according to the third embodiment.

The operations of the driving support system 1 according to the third embodiment correspond to a driving support method according to the third embodiment. The operations of the driving support system 1 according to the third embodiment correspond to driving support program processes according to the third embodiment.

Processes from S701 to S704 are the same as the processes from S101 to S104 in FIG. 2.

In a map transmitting process in S705, the transmitting unit 24*b* transmits, to the driving support apparatus 10, sensor information 51 acquired in S704.

In a map receiving process in S706, the receiving unit 14*b* receives the sensor information 51 transmitted in S705.

In an external identification process in S707, the identification unit 22*b* identifies an attribute 52 of each object around the external apparatus 200, based on the sensor information 51 received in S706.

In an external map generation process in S708, the map generation unit 23*b* generates a second map 53 at a time when the sensor information 51 has been acquired in S704, based on the sensor information 51 received in S706 and the attribute 52 of each object identified in S707.

The second map 53 that is generated is the same as the second map 53 that is generated in S106 in FIG. 2.

In a coordinate synchronization process in S709, a coordinate synchronization unit 15*b* converts the second map 53 so that a second coordinate system being the coordinate system of the second map 53 generated in S708 matches a first coordinate system being the coordinate system of a first map 43 generated in S703, thereby generating a converted map 54.

A process in S710 is the same as the process in S110 in FIG. 2.

\*\*\*Effect of Third Embodiment\*\*\*

As mentioned above, in the driving support system 1, the driving support apparatus 10 generates the second map 53. With this arrangement, the externally mounted apparatus 20 may just acquire the sensor information 51 and may just transmit the sensor information 51 to the driving support apparatus 10. Accordingly, a processing load on the externally mounted apparatus 20 can be reduced.

\*\*\*Alternative Configuration\*\*\*

In the above description, the driving support apparatus 10 has included the identification unit 12 and the identification unit 22*b*, and the map generation unit 13 and the map generation unit 23*b*, as illustrated in FIG. 24. Then, as illustrated in FIG. 25, the processes in S702 to S703 and the processes from S707 to S708 have been executed in parallel.

However, the identification unit 12 and the identification unit 22*b* may be made common as one component, and the map generation unit 13 and the map generation unit 23*b* may be made common as one component. Then, the processes in S702 to S703 and the processes from S707 to S708 may be executed in series.

In the above description, the externally mounted apparatus 20 has transmitted the sensor information 51 to the driving support apparatus 10, and the driving support apparatus 10 has identified the attributes 52 from the sensor information 51 and has generated the second map 53.

However, the externally mounted apparatus 20 may identify the attributes 52 and may transmit the sensor information 51 and the attributes 52 to the driving support apparatus 10. Then, the driving support apparatus 10 may generate the second map 53.

Data to be received by the driving support apparatus 10 from the externally mounted apparatus 20 is not limited to one of the sensor information 51, the sensor information 51 and the attributes 52, and the second map 53, and may be data of a different format if the data is the one regarding the position of each object around the external apparatus 200. Specifically, the data regarding the position is data indicating three-dimensional coordinate values of each obstacle including information of an attribute such as vehicle or man. Specifically, the data of the different format is the sensor information 51 itself acquired by the sensor 32 and three-dimensional coordinate values and image data of one or more objects whose attributes are not identified.

The data herein referred to as such may be in a different form such as information or a signal that is transmitted and received by a computer. Information regarding the position may be information that is explicitly expressed or information included in the data.

Fourth Embodiment

In a fourth embodiment, driving support using the composite map 44 generated in each of the first to third embodiment will be described.

*Description of Configuration*

Figure 26:
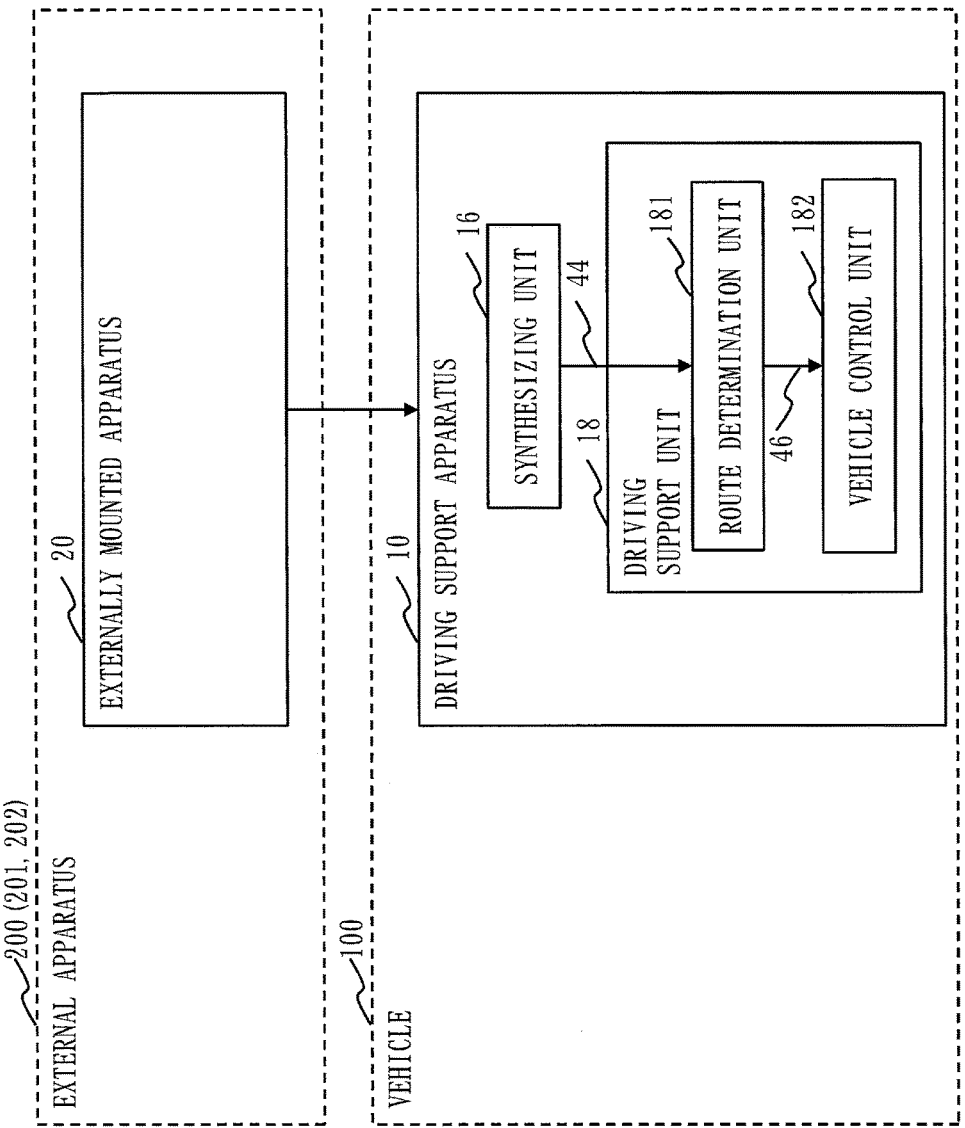
FIG. 26 is a configuration diagram of a driving support system 1 according to a fourth embodiment.

FIG. 26 is a configuration diagram of a driving support system 1 according to the fourth embodiment.

In FIG. 26, the components other than the synthesizing unit 16, which have been described in the first to third embodiments, are omitted.

A driving support apparatus 10 includes, in addition to the configuration described in each of the first to third embodiments, a driving support unit 18.

The driving support unit 18 supports driving of the vehicle 100. The driving support unit 18 includes a route determination unit 181 and a vehicle control unit 182.

The route determination unit 181 determines a travel route 46 based on the composite map 44 generated by the synthesizing unit 16. Specifically, the route determination unit 181 determines the travel route 46 that will not contact one or more obstacles such as pedestrians illustrated in the composite map 44.

The vehicle control unit 182 controls the vehicle 100 so that the vehicle 100 travels on the travel route 46 determined by the route determination unit 181. Specifically, the vehicle control unit 182 controls a steering, driving apparatuses such as an engine and a motor, and a brake included in the vehicle 100 so that the vehicle travels on the travel route 46.

The vehicle control unit 182 may control the vehicle 100 in consideration of other sensor information 41 acquired by the sensor 31 as well as the travel route 46.

*Description of Operations*

Figure 27:
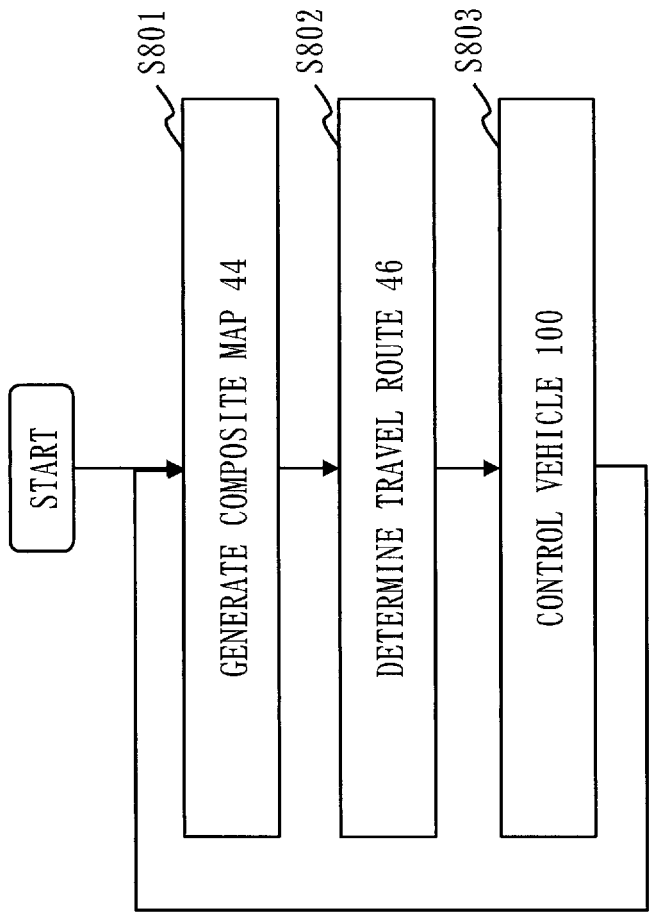
FIG. 27 is a flowchart illustrating operations of the driving support system 1 according to the fourth embodiment.

FIG. 27 is a flowchart illustrating operations of the driving support system 1 according to the fourth embodiment.

The operations of the driving support system 1 according to the fourth embodiment correspond to a driving support method according to the fourth embodiment. The operations of the driving support system 1 according to the fourth embodiment correspond to driving support program processes according to the fourth embodiment.

In a composite map generation process in S801, the driving support system 1 generates a composite map 44 using the method described in each of the first to third embodiments.

In a route determination process in S802, the route determination unit 181 determines a travel route 46 based on the composite map 44 generated in S801.

In a vehicle control process in S803, the vehicle control unit 182 controls the vehicle 100 so that the vehicle 100 travels on the travel route 46 generated in S802.

The processes from S801 to S803 are repeatedly executed, thereby causing the vehicle 100 to be automatically driven.

*Effect of Fourth Embodiment*

As mentioned above, in the driving support system 1, the driving support apparatus 10 automatically drives the vehicle 100, based on the composite map 44.

This eliminates the need for a driver of the vehicle 100 to perform driving, thereby allowing reduction of a burden on the driver.

*Alternative Configuration*

The above description has been given about the configuration of automatically driving the vehicle 100.

Figure 28:
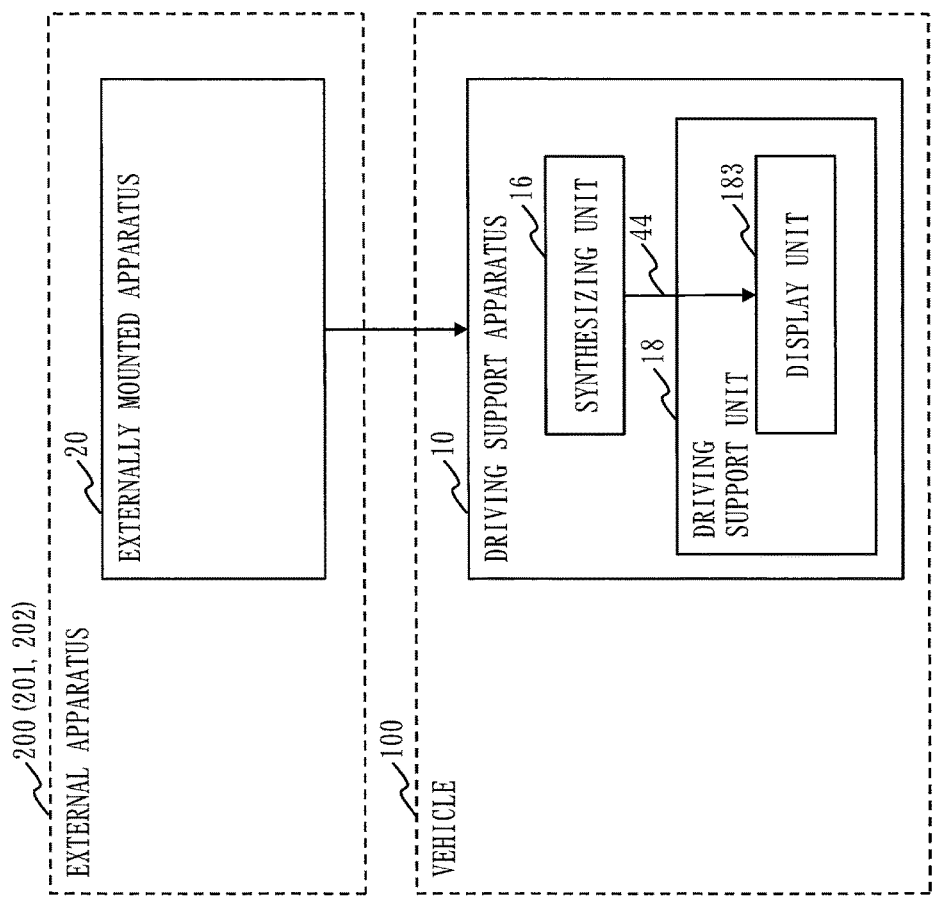
FIG. 28 is a configuration diagram of the driving support system 1 according to the fourth embodiment.

However, a configuration of displaying the composite map 44 may be used. FIG. 28 is a configuration diagram of the driving support system 1 in this case. In the driving support system 1 illustrated in FIG. 28, the driving support unit 18 includes a display unit 183 in place of the route determination unit 181 and the vehicle control unit 182, which is different from the driving support system 1 illustrated in FIG. 26.

The display unit 183 displays the composite map 44 generated by the synthesizing unit 16. This allows the driver of the vehicle 100 to check the composite map 44 while driving, thereby improving safety of the driving. Specifically, the driver can grasp, from the composite map 44, a pedestrian or the like in a position that cannot be seen from the vehicle 100, and can perform the driving of avoiding a contact with the pedestrian.

The driving support unit 18 may include, together with the route determination unit 181 and the vehicle control unit 182, the display unit 183. In this case, the driving support apparatus 10 displays the composite map 44 while automatically driving the vehicle 100.

Figure 29:
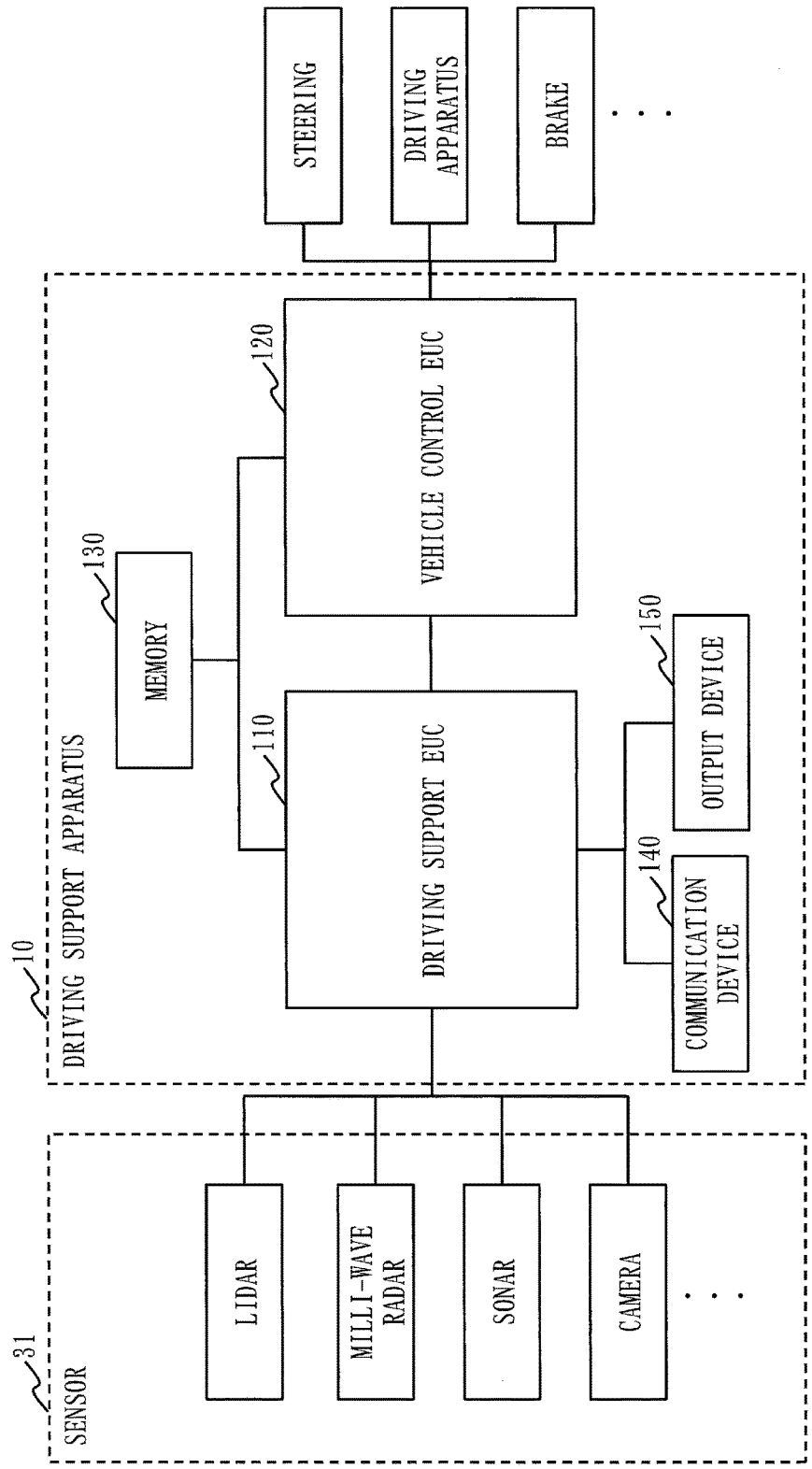
FIG. 29 is a hardware configuration diagram of a driving support apparatus 10 according to the first to fourth embodiments.

FIG. 29 is a hardware configuration diagram of the driving support apparatus 10 according to the first to fourth embodiments.

The driving support apparatus 10 includes a driving support EUC 110 (Electronic Control Unit), a vehicle control EUC 120, a memory 130, a communication device 140, and an output device 150.

Each of the driving support EUC 110 and the vehicle control EUC 120 is implemented by processing circuitry (processing circuitry), an input/output circuit, a power supply circuit, and so on. The processing circuitry is also referred to as a CPU (Central Processing Unit), a processing unit, an arithmetic unit, a microprocessor, a microcomputer, a processor, or a DSP (Digital Signal Processor).

The memory 130 is implemented by a non-volatile or volatile semiconductor memory such as a RAM (Random Access Memory), a ROM (Read Only Memory), a flash memory, an EPROM (Erasable Programmable Read Only Memory), or an EEPROM (Electrically Erasable and Programmable Read Only Memory) and a magnetic disk, a flexible disk, an optical disk, a compact disk, a minidisk, or a DVD, or a combination of at least a part of these memories. Herein, the memory 130 has a configuration whose at least a part can be writable.

The communication device 140 is a communication chip or an NIC (Network Interface Card). The communication device 140 includes a receiver to receive data and a transmitter to transmit data.

The output device 150 is at least one of a display or a loud speaker.

The respective functions of the sensor information acquisition unit 11, the identification unit 12, the map generation unit 13, the receiving unit 14, the coordinate synchronization unit 15, the synthesizing unit 16, the time synchronization unit 17, and the driving support unit 18 in the driving support apparatus 10 are implemented by software, firmware, or a combination of the software and the firmware. Each of the software and the firmware is described as a program and is stored in the memory 130. That is, each of the driving support EUC 110 and the vehicle control EUC 120 reads the program stored in the memory 130 and executes the program, thereby implementing the respective functions.

Herein, the driving support EUC 110 implements the functions of the sensor information acquisition unit 11, the identification unit 12, the map generation unit 13, the receiving unit 14, the coordinate synchronization unit 15, the synthesizing unit 16, the time synchronization unit 17, and the display unit 183. The vehicle control EUC 120 implements the functions of the route determination unit 181 and the vehicle control unit 182.

Each of the driving support EUC 110 and the vehicle control ECU 120 stores, in the memory 130, information, data, signal values, or variable values indicating results of processes of the respective functions, as files.

In the above description, it has been described that the respective functions of the driving support apparatus 10 are implemented by the software, the firmware, or the combination of the software and the firmware. However, at least a part of the respective functions of the driving support apparatus 10 may be implemented by dedicated hardware, and the remainder of the respective functions of the driving support apparatus 10 may be implemented by the software, the firmware, or the combination of the software and the hardware. Specifically, the receiving unit 14 may be implemented by a receiver, and the other functions may be implemented by the software, the firmware, or the combination of the software and the firmware. Alternatively, the display unit 183 may be implemented by a display.

FIG. 30 is a hardware configuration diagram of the externally mounted apparatus 20 according to the first to fourth embodiments.

The externally mounted apparatus 20 includes a driving support EUC 210, a memory 230, and a communication device 240.

The driving support EUC 210 is implemented by processing circuitry (processing circuitry), an input/output circuit, a power supply circuit, and so on. The processing circuitry is also referred to as a CPU (Central Processing Unit), a processing unit, an arithmetic unit, a microprocessor, a microcomputer, a processor, or a DSP (Digital Signal Processor).

The memory 230 is implemented by a non-volatile or volatile semiconductor memory such as a RAM (Random Access Memory), a ROM (Read Only Memory), a flash memory, an EPROM (Erasable Programmable Read Only Memory), or an EEPROM (Electrically Erasable and Programmable Read Only Memory) and a magnetic disk, a flexible disk, an optical disk, a compact disk, a minidisk, or a DVD, or a combination of at least a part of these memories and disks. Herein, the memory 230 has a configuration whose at least a part can be writable.

The communication device 240 is a communication chip or an NIC (Network Interface Card). The communication device 240 includes a receiver to receive data and a transmitter to transmit data.

The respective functions of the sensor information acquisition unit 21, the identification unit 22, the map generation unit 23, and the transmitting unit 24 in the externally mounted apparatus 20 are implemented by software, firmware, or a combination of the software and the firmware. Each of the software and the firmware is described as a program and is stored in the memory 230. That is, the driving support EUC 210 reads the program stored in the memory 230 and executes the program, thereby implementing the respective functions.

The driving support EUC 210 stores, in the memory 230, information, data, signal values, or variable values indicating results of processes of the respective functions, as files.

In the above description, it has been described that the respective functions of the externally mounted apparatus 20 are implemented by the software, the firmware, or the combination of the software and the firmware. However, at least a part of the respective functions of the externally mounted apparatus 20 may be implemented by dedicated hardware, and the remainder of the respective functions of the externally mounted apparatus 20 may be implemented by the software, the firmware, or the combination of the software and the hardware. Specifically, the transmitting unit 24 may be implemented by a transmitter, and the other functions may be implemented by the software, the firmware, or the combination of the software and the firmware.

REFERENCE SIGNS LIST

1: driving support system; 10: driving support apparatus; 11: sensor information acquisition unit; 12: identification unit; 13: map generation unit; 14: receiving unit; 15: coordinate synchronization unit; 16: synthesizing unit; 17: time synchronization unit; 18: driving support unit; 181: route determination unit; 182: vehicle control unit; 183: display unit; 20: externally mounted apparatus; 21: sensor information acquisition unit; 22: identification unit; 23: map generation unit; 24: transmitting unit; 31: sensor; 32: sensor; 41, 51: sensor information; 42, 52: attribute; 43: first map; 44: composite map; 45: time stamp; 46: travel route; 53: second map; 54: converted map; 55: time stamp; 61: target point extraction unit; 62: likelihood computation unit; 63: conversion amount computation unit; 64: coordinate conversion unit; 65: target point; 66: likelihood; 67: conversion amount; 71: second point position computation unit; 72: third point position computation unit; 73: inter-third-point distance computation unit; 74, 75: position; 81: rotation computation unit; 82: translation amount computation unit; 83: converted position computation unit; 84: distance computation unit; 85: converted position; 91: inter-point distance computation unit; 92: difference computation unit; 100: vehicle; 110, 210: driving support EUC; 120: vehicle control EUC; 130, 230: memory; 140, 240: communication device; 150: output device; 200: external apparatus; 201: roadside apparatus; 202: vehicle

The invention claimed is:

1. A driving support apparatus comprising:
processing circuitry
to acquire sensor data from a sensor mounted on a vehicle,
to generate a first map from the acquired sensor data, the first map being a three-dimensional map indicating three-dimensional positions of objects around the vehicle,
to receive a second map from transmission equipment mounted on an external apparatus, the second map being generated from sensor data acquired from a sensor mounted on the external apparatus, the second map being a three-dimensional map indicating three-dimensional positions of objects around the external apparatus, the external apparatus being one of a roadside apparatus and a different vehicle from the vehicle, to convert the second map so that a second coordinate system being a coordinate system of the second map matches a first coordinate system being a coordinate system of the first map generated, and to generate a composite map by synthesizing the first map and the second map after the conversion, wherein the processing circuitry repeatedly extracts, from a plurality of points indicating the three-dimensional positions of the objects in the first map, three target points, as a point a1, a point a2, and a point a3 and repeatedly extracts, from a plurality of points indicating the three-dimensional positions of the objects in the second map, three target points respectively made to correspond to the point a1, the point a2, and the point a3, as a point b1, a point b2, and a point b3, computes a likelihood when the point a1 and the point b1 indicate a same position, the point a2 and the point b2 indicate a same position, and the point a3 and the point b3 indicate a same position, computes a conversion amount for matching the second coordinate system to the first coordinate system, assuming that, with respect to the target points repeatedly extracted and having a high likelihood computed, the point a1 and the point b1 indicate the same position, the point a2 and the point b2 indicate the same position, and the point a3 and the point b3 indicate the same position, converts the second map, using the conversion amount computed, computes, using a distance between the point b1 and the point b2, the position of the point b2 when the point b1 is placed at the same position as the point a1 in the first coordinate system and the point b2 is placed on a straight line X passing through the point a1 and the point a2, computes, using a distance between the point b2 and the point b3, the position of the point b3 when the point b3 is placed on a straight line Z in the first coordinate system, the straight line Z being obtained by moving a straight line Y passing through the point a2 and the point a3 in parallel so that the straight line Y passes through the position of the point b2 computed, and computes a distance between the point a3 and the position of the point b3 computed, as the likelihood.

2. The driving support apparatus according to claim 1, wherein the processing circuitry extracts, as the point b1, a point indicating the position of the object having an attribute being the same as an attribute of the object whose position is indicated by the point a1, extracts, as the point b2, a point indicating the position of the object having an attribute being the same as an attribute of the object whose position is indicated by the point a2, and extracts, as the point b3, a point indicating the position of the object having an attribute being the same as an attribute of the object whose position is indicated by the point a3.

3. The driving support apparatus according to claim 1, wherein the processing circuitry receives a plurality of the second maps from the transmission equipment mounted on the external apparatus, identifies, among the plurality of the second maps received, the second map generated from data acquired at a same time as an acquisition time of data used for generating the first map, and synthesizes the first map and the second map identified.

4. The driving support apparatus according to claim 3, wherein when there is not the second map generated from the data acquired at the same time as the acquisition time, the processing circuitry estimates the second map to be generated from the data acquired at the same time as the acquisition time, using the plurality of the second maps, and synthesizes the first map and the second map estimated.

5. The driving support apparatus according to claim 1, wherein the processing circuitry determines a travel route, based on the composite map generated, and controls the vehicle so that the vehicle travels on the travel route determined.

6. The driving support apparatus according to claim 1, wherein the processing circuitry displays the composite map generated.

7. A driving support apparatus comprising:

processing circuitry to acquire sensor data from a sensor mounted on a vehicle, to generate a first map from the acquired sensor data, the first map being a three-dimensional map indicating three-dimensional positions of objects around the vehicle, to receive a second map from transmission equipment mounted on an external apparatus, the second map being generated from sensor data acquired from a sensor mounted on the external apparatus, the second map being a three-dimensional map indicating three-dimensional positions of objects around the external apparatus, the external apparatus being one of a roadside apparatus and a different vehicle from the vehicle, to convert the second map so that a second coordinate system being a coordinate system of the second map matches a first coordinate system being a coordinate system of the first map generated, and to generate a composite map by synthesizing the first map and the second map after the conversion, wherein the processing circuitry repeatedly extracts, from a plurality of points indicating the three-dimensional positions of the objects in the first map, three target points, as a point a1, a point a2, and a point a3 and repeatedly extracts, from a plurality of points indicating the three-dimensional positions of the objects in the second map, three target points respectively made to correspond to the point a1, the point a2, and the point a3, as a point b1, a point b2, and a point b3, computes a likelihood when the point a1 and the point b1 indicate a same position, the point a2 and the point b2 indicate a same position, and the point a3 and the point b3 indicate a same position, computes a conversion amount for matching the second coordinate system to the first coordinate system, assuming that, with respect to the target points repeatedly extracted and having a high likelihood computed, the point a1 and the point b1 indicate the same position, the point a2 and the point b2 indicate the same position, and the point a3 and the point b3 indicate the same position, converts the second map, using the conversion amount computed, computes a rotation amount when a straight line Y passing through the point b1 and the point b2 in the second coordinate system is converted to a straight line parallel to a straight line X passing through the point a1 and the point a2 in the first coordinate system, computes a translation amount in the conversion amount when a rotation amount in the conversion amount for matching the second coordinate system to the first coordinate system is assumed to be the rotation amount computed, computes the positions of the point b1, the point b2, and the point b3 in the first coordinate system, based on the rotation amount computed and the translation amount computed, and computes a sum of a distance between the point a1 and the position of the point b1 computed, a distance between the point a2 and the position of the b2 computed, and a distance between the point a3 and the position of the point b3 computed, as the likelihood.

8. A driving support apparatus comprising:

processing circuitry to acquire sensor data from a sensor mounted on a vehicle, to generate a first map from the acquired sensor data, the first map being a three-dimensional map indicating three-dimensional positions of objects around the vehicle, and to receive a second map from transmission equipment mounted on an external apparatus, the second map being generated from sensor data acquired from a sensor mounted on the external apparatus, the second map being a three-dimensional map indicating three-dimensional positions of objects around the external apparatus, the external apparatus being one of a roadside apparatus and a different vehicle from the vehicle, to convert the second map so that a second coordinate system being a coordinate system of the second map matches a first coordinate system being a coordinate system of the first map, and to generate a composite map by synthesizing the first map and the second map after the conversion, wherein the processing circuitry repeatedly extracts, from a plurality of points indicating the three-dimensional positions of the objects in the first map, three target points, as a point a1, a point a2, and a point a3 and repeatedly extracts, from a plurality of points indicating the three-dimensional positions of the objects in the second map, three target points respectively made to correspond to the point a1, the point a2, and the point a3, as a point b1, a point b2, and a point b3, computes a likelihood when the point a1 and the point b1 indicate a same position, the point a2 and the point b2 indicate a same position, and the point a3 and the point b3 indicate a same position, computes a conversion amount for matching the second coordinate system to the first coordinate system, assuming that, with respect to the target points repeatedly extracted and having a high likelihood computed, the point a1 and the point b1 indicate the same position, the point a2 and the point b2 indicate the same position, and the point a3 and the point b3 indicate the same position, converts the second map, using the conversion amount computed, computes a distance a12 between the point a1 and the point a2, a distance a23 between the point a2 and the point a3, a distance a13 between the point a1 and the point a3, a distance b12 between the point b1 and the point b2, a distance b23 between the point b2 and the point b3, and a distance b13 between the point b1 and the point b3, and computes a sum of a difference between the distance a12 and the distance b12, a difference between the distance a23 and the distance b23, and a difference between the distance a13 and the distance b13, as the likelihood.

9. A driving support system comprising a driving support apparatus installed on a vehicle and an externally mounted apparatus mounted on an external apparatus being one of a roadside apparatus and a different vehicle from the vehicle, wherein the externally mounted apparatus includes:

a first sensor to detect positions of objects around the external apparatus; and a transmitting unit to transmit data regarding the detected positions of objects around the external apparatus to the driving support apparatus, wherein the driving support apparatus includes:

processing circuitry to acquire sensor data from a second sensor mounted on the vehicle, to generate a first map from the acquired sensor data, the first map being a three-dimensional map indicating three-dimensional positions of objects around the vehicle, to receive the data regarding the positions transmitted by the transmitting unit, to convert a second map obtained from the received data regarding the positions so that a second coordinate system being a coordinate system of the second map matches a first coordinate system being a coordinate system of the first map, and to generate a composite map by synthesizing the first map and the second map after the conversion, wherein the processing circuitry repeatedly extracts, from a plurality of points indicating the three-dimensional positions of the objects in the first map, three target points, as a point a1, a point a2, and a point a3 and to repeatedly extract, from a plurality of points indicating the three-dimensional positions of the objects in the second map, three target points respectively made to correspond to the point a1, the point a2, and the point a3, as a point b1, a point b2, and a point b3;

computes a likelihood when the point a1 and the point b1 indicate a same position, the point a2 and the point b2 indicate a same position, and the point a3 and the point b3 indicate a same position;

computes a conversion amount for matching the second coordinate system to the first coordinate system, assuming that, with respect to the target points repeatedly extracted by the target point extraction unit and having a high computed likelihood, the point a1 and the point b1 indicate the same position, the point a2 and the point b2 indicate the same position, and the point a3 and the point b3 indicate the same position;

converts the second map, using the conversion amount;

computes, using a distance between the point b1 and the point b2, the position of the point b2 when the point b1 is placed at the same position as the point a1 in the first coordinate system and the point b2 is placed on a straight line X passing through the point a1 and the point a2;

computes, using a distance between the point b2 and the point b3, the position of the point b3 when the point b3 is placed on a straight line Z in the first coordinate system, the straight line Z being obtained by moving a straight line Y passing through the point a2 and the point a3 in parallel so that the straight line Y passes through the position of the point b2; and computes a distance between the point a3 and the position of the point b3, as the likelihood.

10. A driving support method comprising:

acquiring sensor data from a sensor mounted on a vehicle;

generating a first map from the acquired sensor data, the first map being a three-dimensional map indicating three-dimensional positions of objects around a vehicle; and receiving a second map from transmission equipment mounted on an external apparatus, the second map being generated from sequence data acquired from a sensor mounted on the external apparatus, the second map being a three-dimensional map indicating three-dimensional positions of objects around the external apparatus, the external apparatus being one of a roadside apparatus and a different vehicle from the vehicle;

converting the second map so that a second coordinate system being a coordinate system of the second map matches a first coordinate system being a coordinate system of the first map generated; and generating a composite map by synthesizing the first map and the second map after the conversion, wherein converting the second map includes:

repeatedly extracting, from a plurality of points indicating the three-dimensional positions of the objects in the first map, three target points, as a point a1, a point a2, and a point a3 and repeatedly extracting, from a plurality of points indicating the three-dimensional positions of the objects in the second map, three target points respectively made to correspond to the point a1, the point a2, and the point a3, as a point b1, a point b2, and a point b3;

computing a likelihood when the point a1 and the point b1 indicate a same position, the point a2 and the point b2 indicate a same position, and the point a3 and the point b3 indicate a same position;

computing a conversion amount for matching the second coordinate system to the first coordinate system, assuming that, with respect to the target points repeatedly extracted by the target point extraction step and having a high likelihood computed by the likelihood computation step, the point a1 and the point b1 indicate the same position, the point a2 and the point b2 indicate the same position, and the point a3 and the point b3 indicate the same position; and converting the second map, using the conversion amount computed, and wherein computing the likelihood includes:

computing, using a distance between the point b1 and the point b2, the position of the point b2 when the point b1 is placed at the same position as the point a1 in the first coordinate system and the point b2 is placed on a straight line X passing through the point a1 and the point a2;

computing, using a distance between the point b2 and the point b3, the position of the point b3 when the point b3 is placed on a straight line Z in the first coordinate system, the straight line Z being obtained by moving a straight line Y passing through the point a2 and the point a3 in parallel so that the straight line Y passes through the position of the point b2 computed; and computing a distance between the point a3 and the position of the point b3 computed, as the likelihood.

11. A non-transitory computer readable medium storing a driving support program to cause a computer to execute a process including:

acquiring sensor data from a sensor mounted on a vehicle;

generating a first map from the acquired sensor data, the first map being a three-dimensional map indicating three-dimensional positions of objects around the vehicle;

receiving a second map from transmission equipment mounted on an external apparatus, the second map being generated from sensor data acquired from a sensor mounted on the external apparatus, the second map being a three-dimensional map indicating three-dimensional positions of objects around the external apparatus, the external apparatus being one of a roadside apparatus and a different vehicle from the vehicle;

converting the second map so that a second coordinate system being a coordinate system of the second map matches a first coordinate system being a coordinate system of the first map; and generating a composite map by synthesizing the first map and the second map after the conversion, wherein the converting step includes:

repeatedly extracting, from a plurality of points indicating the three-dimensional positions of the objects in the first map, three target points, as a point a1, a point a2, and a point a3 and repeatedly extracting, from a plurality of points indicating the three-dimensional positions of the objects in the second map, three target points respectively made to correspond to the point a1, the point a2, and the point a3, as a point b1, a point b2, and a point b3;

computing a likelihood when the point a1 and the point b1 indicate a same position, the point a2 and the point b2 indicate a same position, and the point a3 and the point b3 indicate a same position;

computing a conversion amount for matching the second coordinate system to the first coordinate system, assuming that, with respect to the target points repeatedly extracted and having a high computed likelihood, the point a1 and the point b1 indicate the same position, the point a2 and the point b2 indicate the same position, and the point a3 and the point b3 indicate the same position; and converting the second map, using the conversion amount, and wherein the likelihood computation process includes:

computing, using a distance between the point b1 and the point b2, the position of the point b2 when the point b1 is placed at the same position as the point a1 in the first coordinate system and the point b2 is placed on a straight line X passing through the point a1 and the point a2;

computing, using a distance between the point b2 and the point b3, the position of the point b3 when the point b3 is placed on a straight line Z in the first coordinate system, the straight line Z being obtained by moving a straight line Y passing through the point a2 and the point a3 in parallel so that the straight line Y passes through the position of the point b2; and computing a distance between the point a3 and the position of the point b3, as the likelihood.

* * * * *